(12) United States Patent
Wisgo

(10) Patent No.: US 10,198,560 B2
(45) Date of Patent: Feb. 5, 2019

(54) ENFORCING LICENSING POLICIES USING AN APPLICATION WRAPPER

(71) Applicant: Citrix Systems, Inc., Fort Lauderdale, FL (US)

(72) Inventor: Jeffrey David Wisgo, Tamarac, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 683 days.

(21) Appl. No.: 14/657,267

(22) Filed: Mar. 13, 2015

(65) Prior Publication Data
US 2016/0267257 A1 Sep. 15, 2016

(51) Int. Cl.
*G06F 15/173* (2006.01)
*G06F 21/10* (2013.01)
(Continued)

(52) U.S. Cl.
CPC ............ *G06F 21/105* (2013.01); *G06F 21/12* (2013.01); *G06Q 30/04* (2013.01); *G06Q 50/184* (2013.01); *G06F 2221/0775* (2013.01)

(58) Field of Classification Search
CPC ......... H04L 29/06; H04L 12/26; G06F 9/445; G06F 21/00
(Continued)

(56) References Cited

U.S. PATENT DOCUMENTS 6,021,438 A * 2/2000 Duvvoori .............. G06F 21/105
709/224
6,920,567 B1 * 7/2005 Doherty .................. G06F 21/10
707/999.104

(Continued)

FOREIGN PATENT DOCUMENTS

EP 0715243 A1 6/1996
WO 0067095 A1 11/2000

OTHER PUBLICATIONS

Jan. 29, 2016 (WO) International Search Report and Written Opinion—App. PCT/US2015/023782.
(Continued)

*Primary Examiner* — Oluseye Iwarere
*Assistant Examiner* — Seye Iwarere
(74) *Attorney, Agent, or Firm* — Banner & Witcoff, Ltd.

(57) ABSTRACT

Methods, systems, computer-readable media, and apparatuses for enforcing licensing policies using an application wrapper are presented. In one or more embodiments, a computing device may monitor, using a first application wrapper of a first application on the computing device, usage of the first application. The first application wrapper of the first application may provide a policy enforcement layer between the first application and an operating system of the computing device, and the policy enforcement layer may control execution of the first application based on one or more mobile device management policies. Subsequently, the computing device may enforce, using the first application wrapper of the first application, one or more licensing policies on the first application at runtime based on the usage of the first application. In some embodiments, the policy enforcement layer may control execution of the first application by intercepting input to the first application, intercepting output from the first application, and intercepting function calls made by the first application.

20 Claims, 18 Drawing Sheets

(51) Int. Cl.
*G06Q 30/04* (2012.01)
*G06Q 50/18* (2012.01)
*G06F 21/12* (2013.01)

(58) Field of Classification Search
USPC .......................... 713/165; 726/1, 22; 709/224
See application file for complete search history.

(56) References Cited

U.S. PATENT DOCUMENTS

| | | | | |
|---|---|---|---|---|
| 8,732,841 | B2* | 5/2014 | Ronning | G06F 21/10 726/26 |
| 8,909,925 | B2* | 12/2014 | Baskaran | G06F 21/10 713/165 |
| 9,081,981 | B2* | 7/2015 | Lim | G06F 21/6218 |
| 9,253,170 | B2* | 2/2016 | Linga | G06F 21/44 |
| 9,405,723 | B2* | 8/2016 | Koneru | G06F 15/173 |
| 9,455,886 | B2* | 9/2016 | Qureshi | H04L 12/2856 |
| 2006/0059099 | A1* | 3/2006 | Ronning | G06F 21/10 705/59 |
| 2006/0059100 | A1* | 3/2006 | Ronning | G06F 21/10 705/59 |
| 2007/0156694 | A1* | 7/2007 | Lim | G06F 21/6218 |
| 2007/0192864 | A1* | 8/2007 | Bryant | G06F 21/54 726/23 |
| 2010/0146269 | A1* | 6/2010 | Baskaran | G06F 21/10 713/165 |
| 2011/0296402 | A1* | 12/2011 | Heyman | G06F 21/10 717/176 |
| 2013/0298185 | A1* | 11/2013 | Koneru | G06F 15/173 726/1 |
| 2014/0032449 | A1* | 1/2014 | Kacin | H04L 41/0883 706/12 |
| 2014/0137179 | A1* | 5/2014 | Christodorescu | G06F 21/53 726/1 |
| 2014/0157351 | A1* | 6/2014 | Canning | H04L 63/20 726/1 |
| 2014/0181803 | A1* | 6/2014 | Cooper | G06F 8/60 717/178 |
| 2014/0295821 | A1* | 10/2014 | Qureshi | H04L 43/04 455/419 |
| 2014/0297838 | A1* | 10/2014 | Qureshi | H04L 12/2856 709/224 |
| 2014/0297839 | A1* | 10/2014 | Qureshi | H04L 12/2856 709/224 |
| 2014/0297840 | A1* | 10/2014 | Qureshi | G06F 21/41 709/224 |
| 2014/0297859 | A1* | 10/2014 | Qureshi | H04L 12/2856 709/225 |
| 2014/0298403 | A1* | 10/2014 | Qureshi | G06F 21/41 726/1 |
| 2015/0200921 | A1* | 7/2015 | Linga | G06F 21/44 713/171 |

OTHER PUBLICATIONS

IBM Corp., "Chapter 1. The Cryptolope Live! Product: Chapter 1," IBM Cryptolope Live, General Information Guide, Version 1, Release 1, pp. 1-36 (1997).

Aug. 6, 2018 (EP) Examination Report—App. 15801516.4.

* cited by examiner

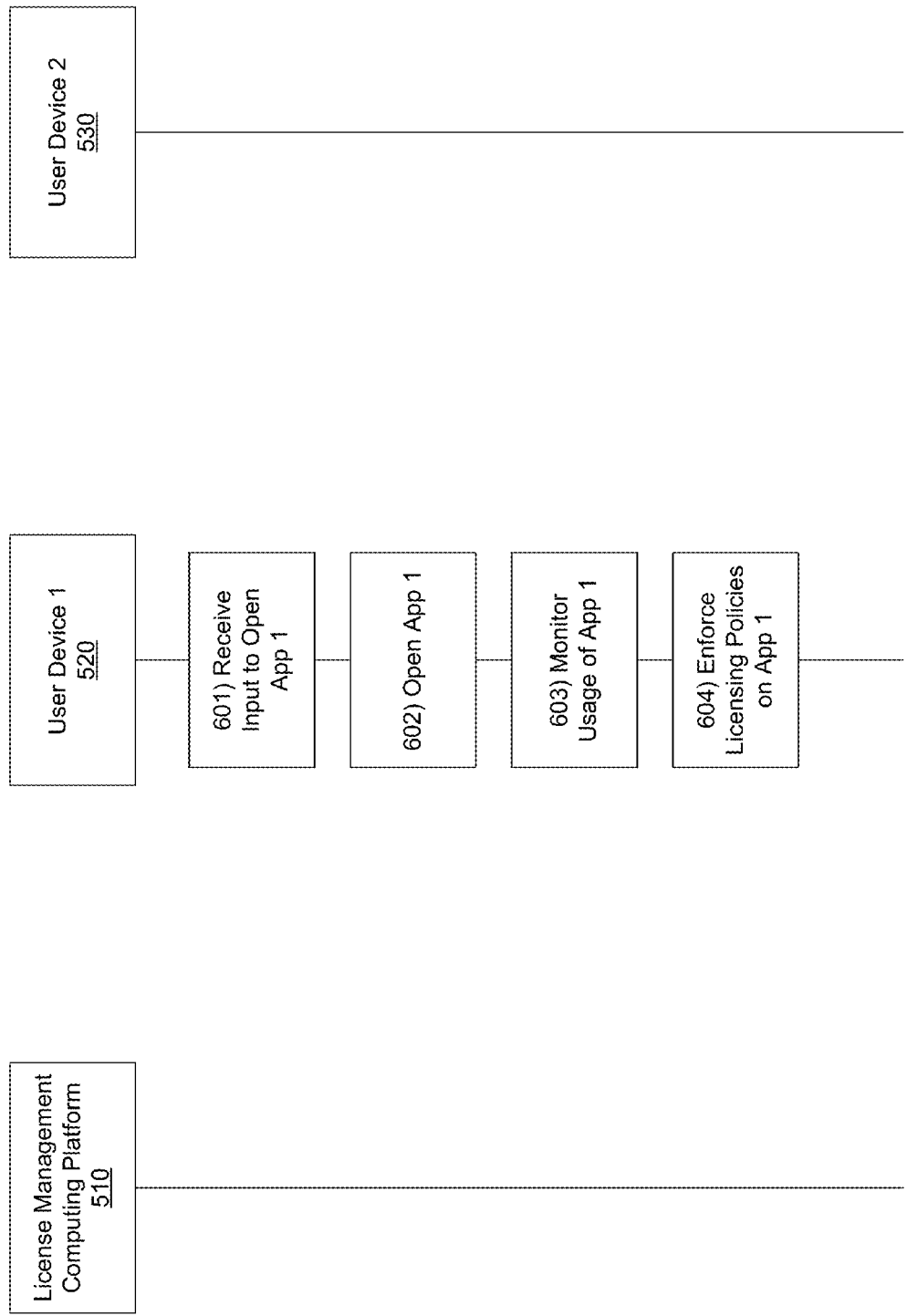

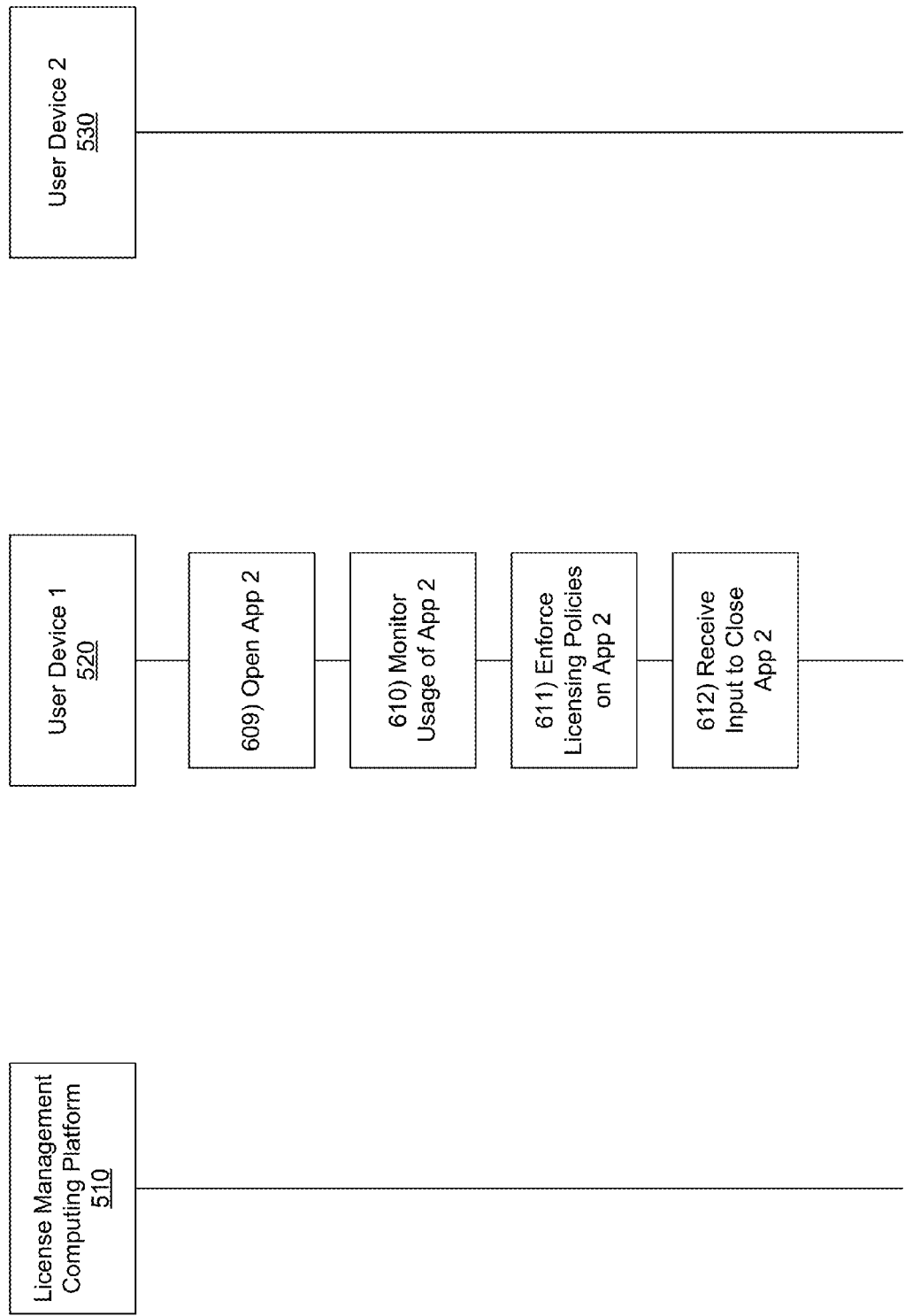

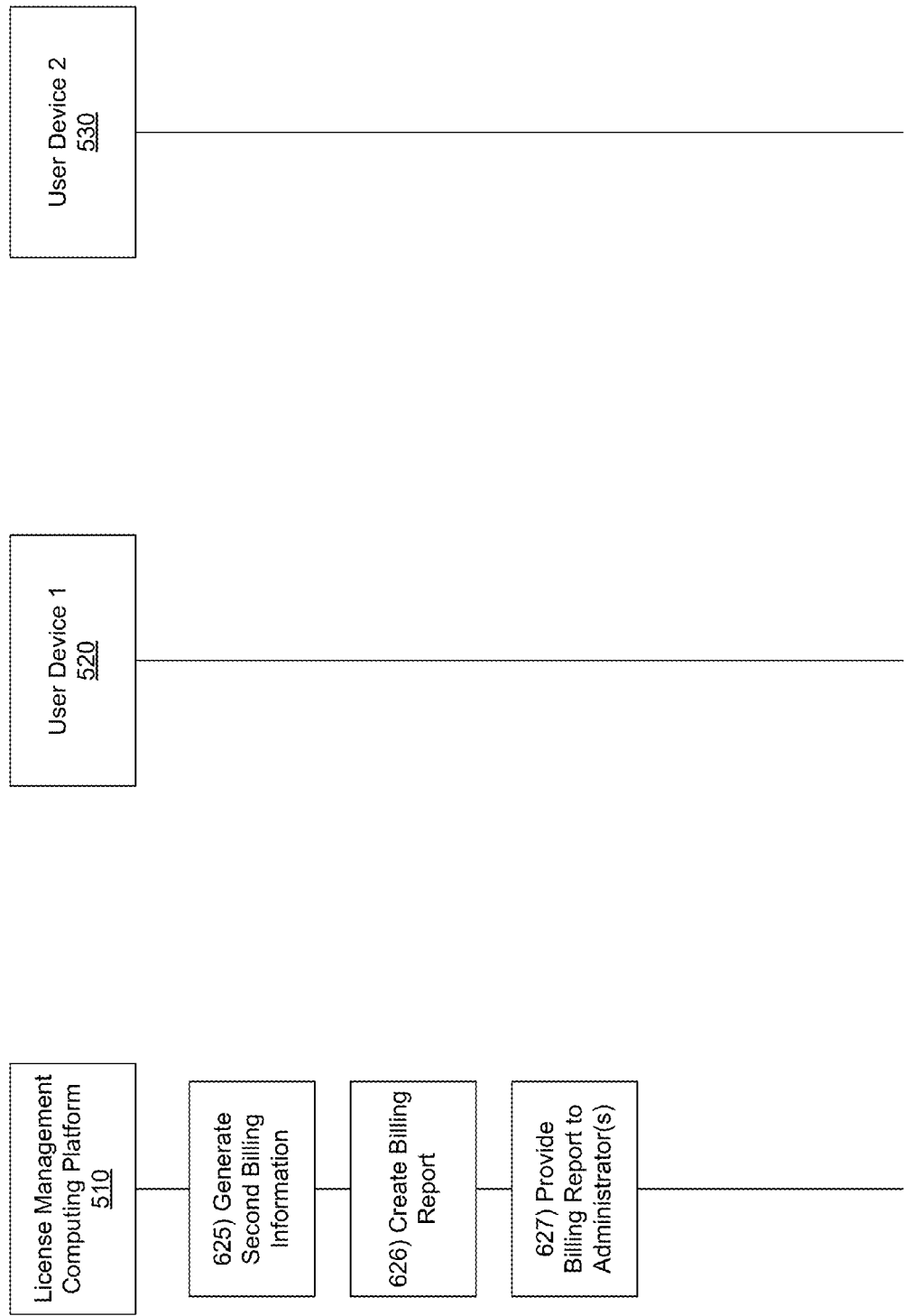

ENFORCING LICENSING POLICIES USING AN APPLICATION WRAPPER

BACKGROUND

Aspects of the disclosure relate to computer hardware and software. In particular, one or more aspects of the disclosure generally relate to computer hardware and software for enforcing one or more licensing policies using one or more application wrappers.

Mobile devices are becoming increasingly popular for both personal use and business use. Corporations and other organizations are providing their employees and other associates with, and/or otherwise enabling their employees and other associates to use, mobile devices, such as smart phones, tablet computers, and other mobile computing devices. As these devices continue to grow in popularity and provide an increasing number of functions, many organizations may wish to ensure that the software applications that are executing on such devices are safe and secure, both for the protection of the device users and for the protection of the organization itself and its own computer systems and networks.

In many instances, corporations and other organizations may deploy, use, and/or otherwise provide their employees and other associates with many different software applications to be used on mobile devices. In addition, different applications often may be subject to different license constraints, and administrators of the organization might need to individually manage licenses for individual applications. In some instances, managing licenses for various software applications can be quite difficult for a large organization that may deploy many different applications, as well as different combinations of applications, to different mobile devices of different users who may have different roles within the organization and, accordingly, different needs.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards computer hardware and software for enforcing one or more licensing policies using one or more application wrappers. In particular, aspects of the disclosure provide efficient, effective, convenient, and scalable ways of managing licenses for different applications using application wrappers.

In some instances, an organization may secure a particular mobile device and/or a particular software application (which may, e.g., be executed by a mobile device) by wrapping the software application with an application wrapper. Such an application wrapper may, for example, provide a policy enforcement layer that may exist between the software application and an operating system of the mobile device (e.g., so as to provide a sandbox in which the software application may be executed) and that may intercept input to the application, output from the application, and/or function calls made by the application to modify and/or otherwise alter the typical and/or default manner in which the application may be executed. In particular, the application wrapper may enforce one or more policies (which may, e.g., be defined in one or more policy files) on the application that may be set by the organization seeking to secure the mobile device and/or the particular application. The policies may, for example, prevent specific features of the application from being used when the mobile device and/or the application is in one or more specific states (e.g., if the device is in a restricted location, if the device is connected to an unsecured network, if one or more other specific programs are open and/or running on the device, etc.). Thus, in enforcing such policies, the application wrapper may selectively enable and/or selectively disable one or more specific features of the application based on device state information (which may, e.g., be monitored by the application wrapper and/or by a mobile device management agent which may be installed on the device and which may communicate with the application wrapper). By securing a mobile device and/or a particular mobile device application with an application wrapper, an organization may, for instance, be able to control how the application is executed by a plurality of different mobile devices that are used by a plurality of different enterprise users (who may, e.g., be employees of the organization and/or otherwise associated with the organization).

In one or more arrangements discussed in greater detail below, license management and enforcement functionality and/or payment functionality may be incorporated into and/or provided by one or more application wrappers. By including license management and enforcement functionality and/or payment functionality in an application wrapper in accordance with various aspects of the disclosure, efficient, effective, convenient, and consistent user experiences may be provided both to end users of wrapped applications and administrative users of an enterprise organization who may manage and/or distribute the applications to various mobile devices and manage licensing considerations for these applications.

In one or more embodiments, a computing device may monitor, using a first application wrapper of a first application on a computing device, usage of the first application. The first application wrapper of the first application may provide a policy enforcement layer between the first application and an operating system of the computing device, and the policy enforcement layer may control execution of the first application based on one or more mobile device management policies. Subsequently, the computing device may enforce, using the first application wrapper of the first application, one or more licensing policies on the first application at runtime based on the usage of the first application.

The one or more licensing policies may, for example, define various terms subject to which the first application may be used. For instance, the one or more licensing policies may define specific times and/or dates at which the first application may be used. Additionally or alternatively, the one or more licensing policies may define specific users that are authorized and/or prohibited from using the first application. Additionally or alternatively, the one or more licensing policies may define specific devices and/or specific types of devices that are authorized and/or prohibited from using the first application. Additionally or alternatively, the one or more licensing policies may define a specific number of devices and/or a specific number of users of an organization that may use the first application at a particular time and/or during a specific time period. Additionally or alternatively, the one or more licensing policies may define one or more billing rates at which usage of the first application may be charged for payment purposes to an organization and/or to specific users of an organization. Additionally or alternatively, the one or more licensing policies may define one or more other license terms and/or payment terms on which authorized usage of the first application may be conditioned.

In some embodiments, the policy enforcement layer may control execution of the first application by intercepting input to the first application, intercepting output from the first application, and intercepting function calls made by the first application.

In some embodiments, enforcing the one or more licensing policies on the first application at runtime may include allowing the first application to be used based on validating a license for the first application.

In some embodiments, enforcing the one or more licensing policies on the first application at runtime may include preventing the first application from being used.

In some embodiments, enforcing the one or more licensing policies on the first application at runtime may include prompting a user of the computing device to provide payment information.

In some embodiments, enforcing the one or more licensing policies on the first application at runtime comprises generating billing information based on the usage of the first application. In some instances, usage of a first function of the first application may be billed at a first billing rate, and usage of a second function of the first application may be billed at a second billing rate different from the first billing rate. In these instances, the first application wrapper of the first application may track the usage of the first function of the first application and the usage of the second function of the first application to generate the billing information.

In some instances, usage of the first application by a first user may be billed at a first billing rate, and usage of the first application by a second user may be billed at a second billing rate different from the first billing rate. In these instances, the first application wrapper of the first application may track the usage of the first application by the first user and the usage of the first application by the second user to generate the billing information.

In some instances, usage of the first application by a first user may be billed to a first division of an enterprise organization associated with the one or more mobile device management policies, and usage of the first application by a second user may be billed to a second division of the enterprise organization different from the first division of the enterprise organization. In these instances, the first application wrapper of the first application may track the usage of the first application by the first user and the usage of the first application by the second user to generate the billing information.

In some embodiments, the computing device may provide, using the first application wrapper of the first application, usage information to a license management server that is configured to generate billing information based on the usage information, and the usage information may identify the monitored usage of the first application.

In some embodiments, the computing device may monitor, using a second application wrapper of a second application on the computing device, usage of the second application. The second application wrapper of the second application may provide a second policy enforcement layer between the second application and the operating system of the computing device, and the second policy enforcement layer may control execution of the second application based on a second set of one or more mobile device management policies. Subsequently, the computing device may enforce, using the second application wrapper of the second application, a second set of one or more licensing policies on the second application at runtime based on the usage of the second application.

In one or more additional embodiments, a computing platform having at least one processor, a memory, and a communication interface may receive, via the communication interface, first usage information from a first application wrapper of a first application on a first computing device used by a first enterprise user of an enterprise organization. Subsequently, the computing platform may generate first billing information based on the first usage information. Thereafter, the computing platform may receive, via the communication interface, second usage information from a second application wrapper of a second application on a second computing device used by a second enterprise user of the enterprise organization. Subsequently, the computing platform may generate second billing information based on the second usage information. Thereafter, the computing platform may compile the first billing information and the second billing information into a billing report. Subsequently, the computing platform may provide, via the communication interface, the billing report to a third computing device used by an administrative user of the enterprise organization.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which:

FIGS. 6A-6G depict an example event sequence for enforcing licensing policies using an application wrapper in accordance with one or more example embodiments.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
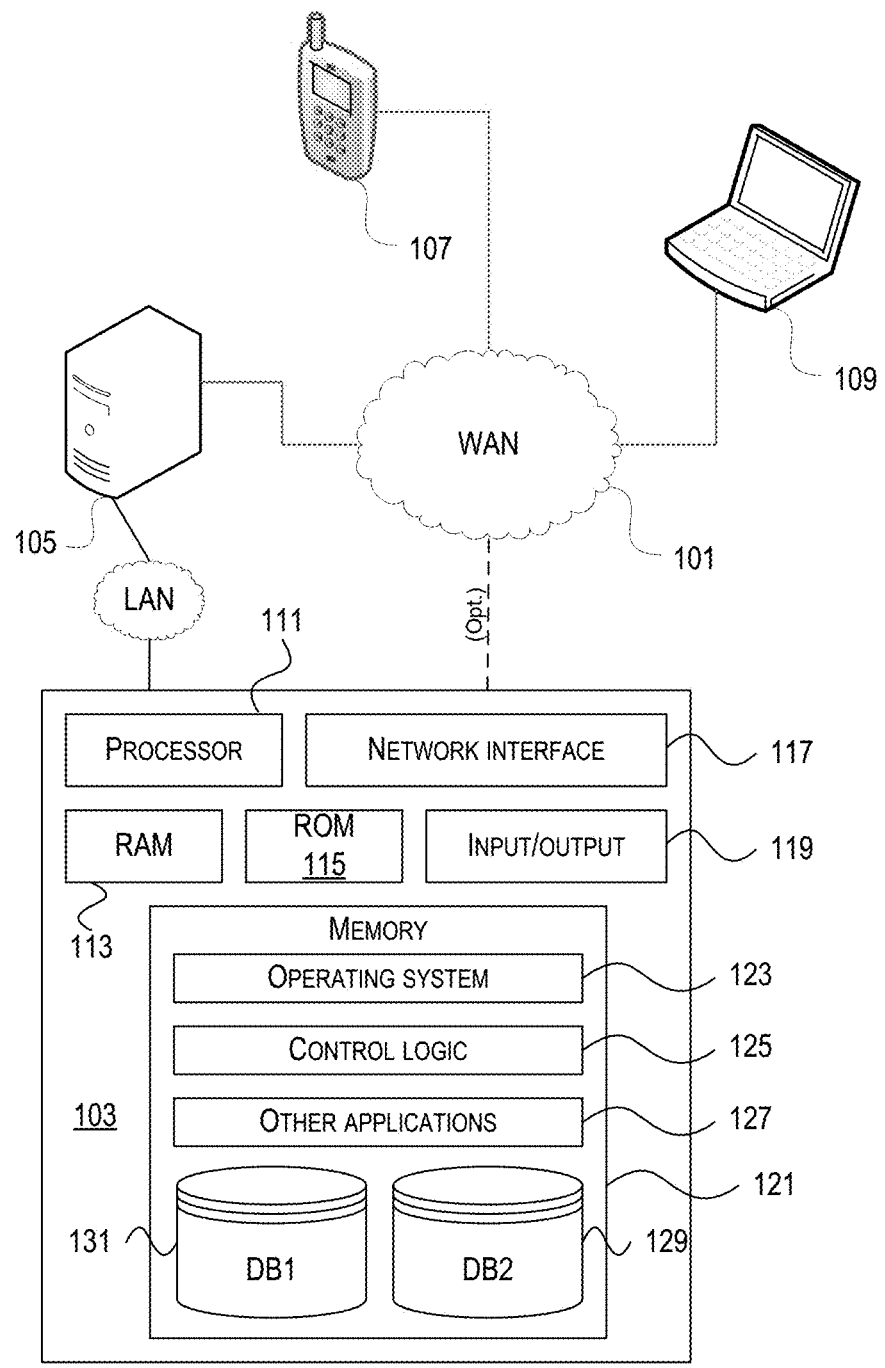
FIG. 1 depicts an illustrative computer system architecture that may be used in accordance with one or more example embodiments.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
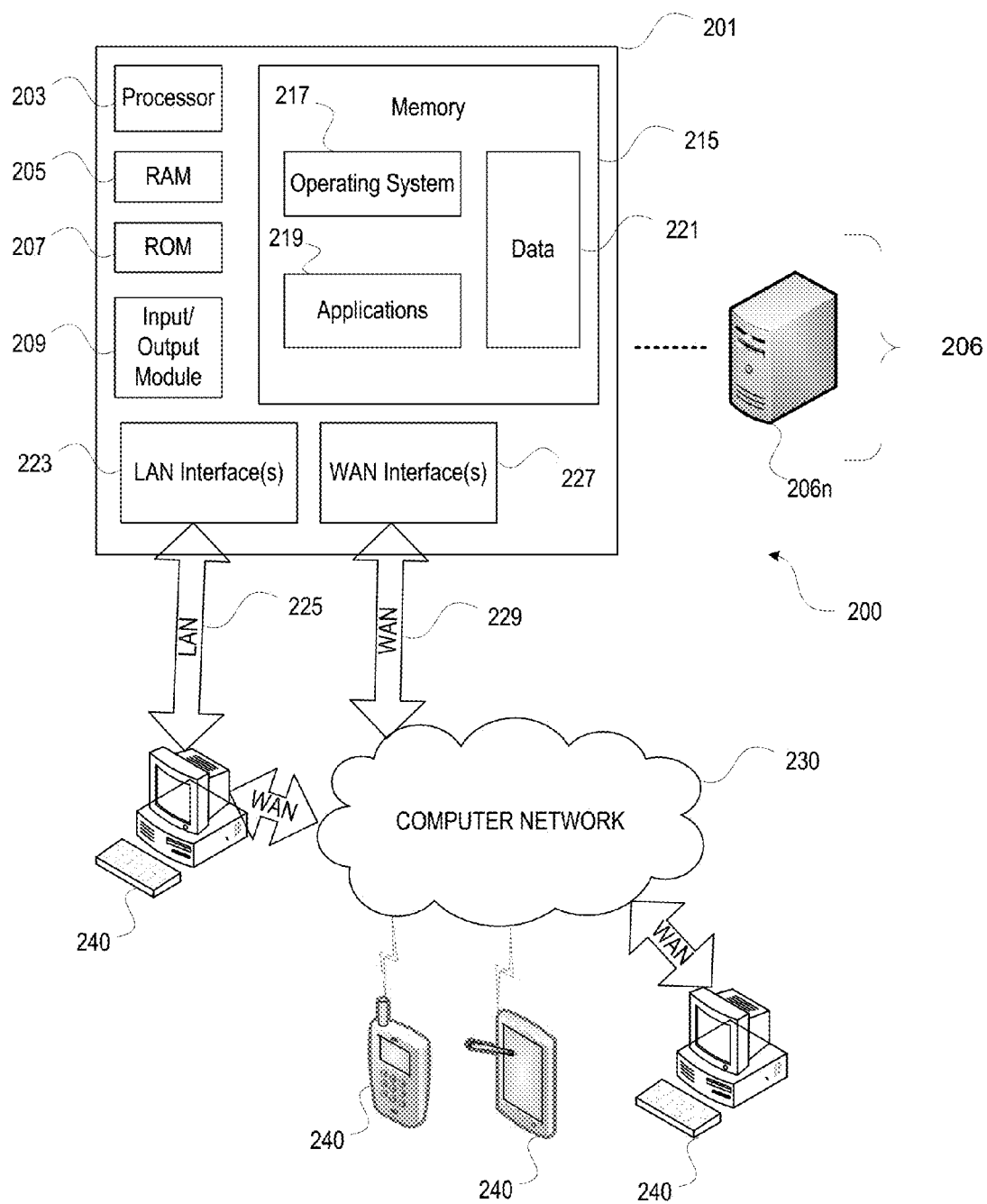
FIG. 2 depicts an illustrative remote-access system architecture that may be used in accordance with one or more example embodiments.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
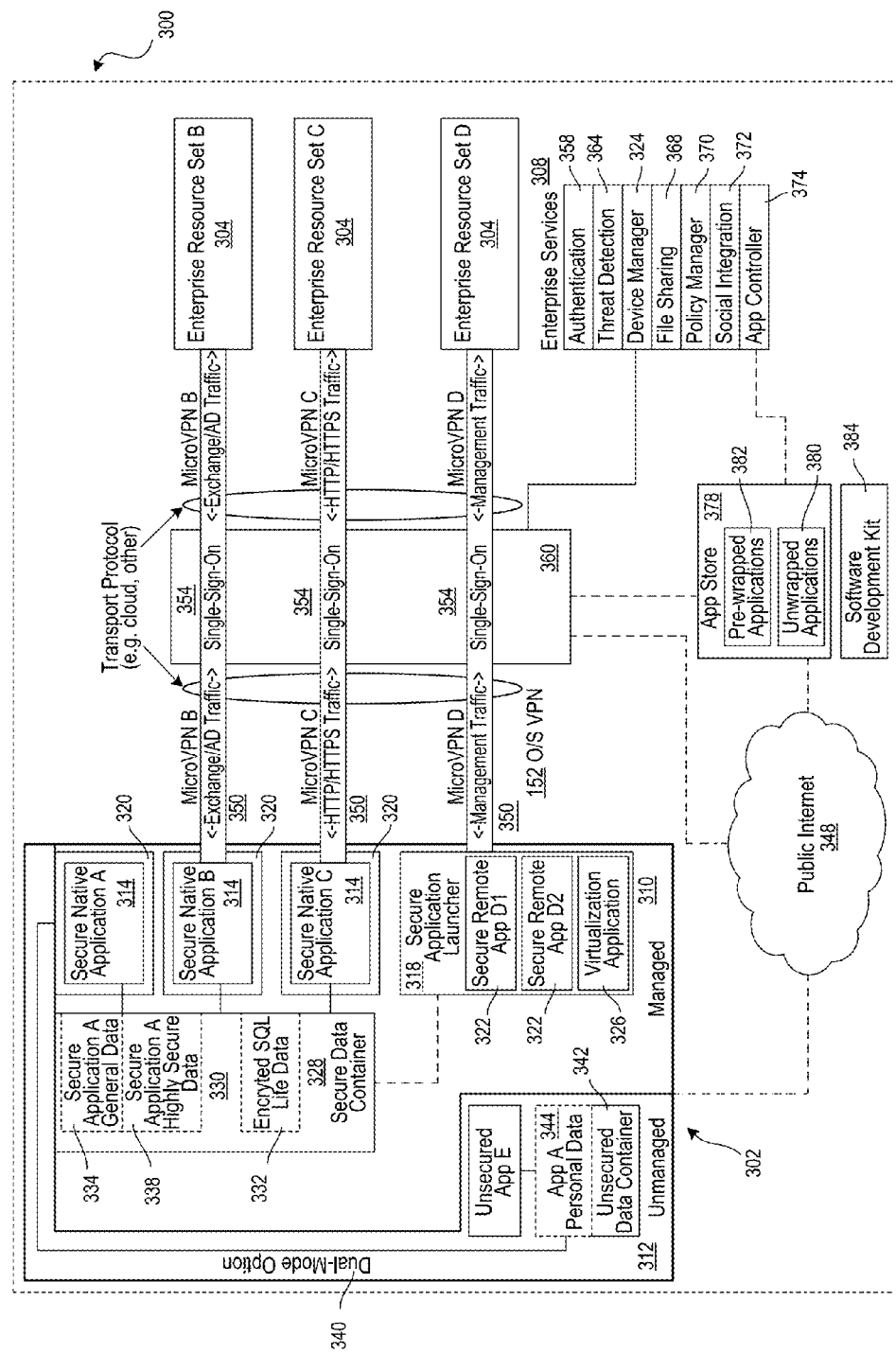
FIG. 3 depicts an illustrative enterprise mobility management system that may be used in accordance with one or more example embodiments.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, an Android operating system, or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
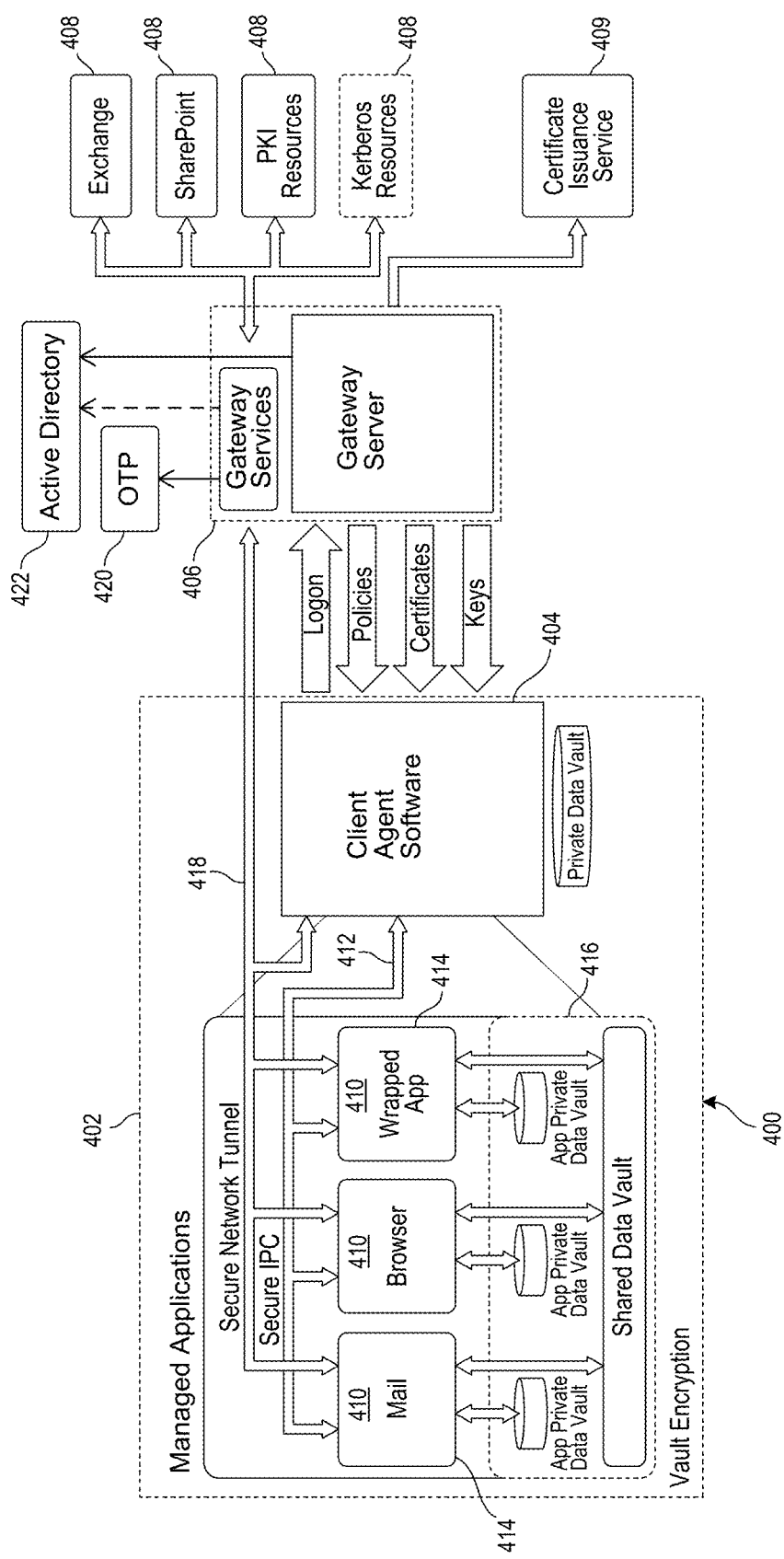
FIG. 4 depicts another illustrative enterprise mobility management system that may be used in accordance with one or more example embodiments.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in FIG. 3, above, are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Enforcing Licenses on Software Applications Using Application Wrappers

Figure 5:
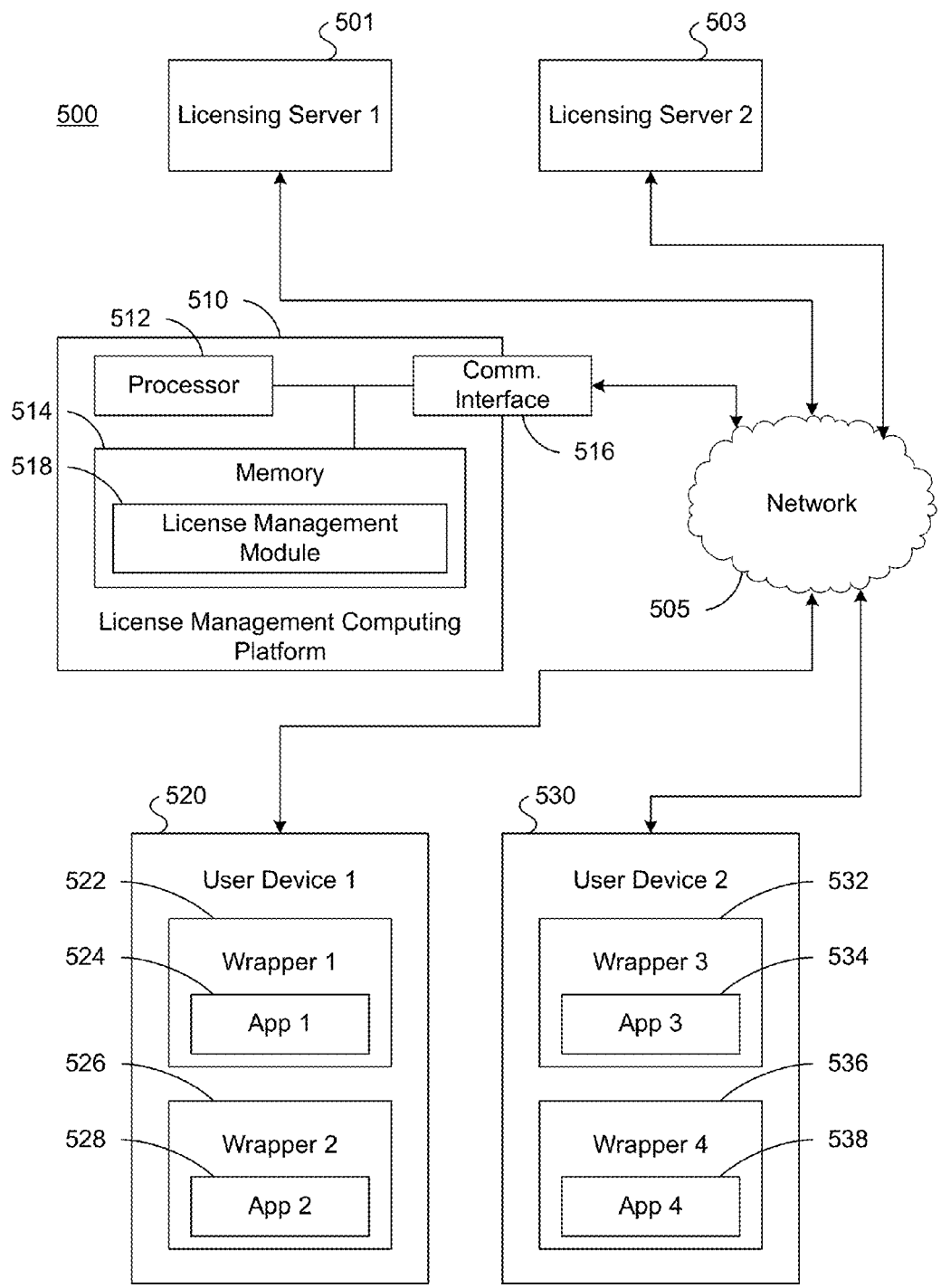
FIG. 5 depicts an illustrative computing environment for enforcing licensing policies using an application wrapper in accordance with one or more example embodiments.

FIG. 5 depicts an illustrative computing environment for enforcing licensing policies using an application wrapper in accordance with one or more example embodiments. Referring to FIG. 5, computing environment 500 may include one or more computing devices. For example, computing environment 500 may include one or more licensing servers, such as licensing server 501 (which may, e.g., be operated by a first software developer and which may control licensing of one or more software applications developed and/or distributed by the first software developer) and licensing server 503 (which may, e.g., be operated by a second software developer different from the first software developer and which may control licensing of one or more software applications developed and/or distributed by the second software developer). Computing environment 500 also may include one or more user computing devices. For example, computing environment 500 may include user computing device 520 (which may, e.g., be a mobile computing device that is used by a first enterprise user) and user computing device 530 (which may, e.g., be a mobile computing device that is used by a second enterprise user different from the first enterprise user).

Licensing server 501, licensing server 503, user computing device 520, and user computing device 530 may be any type of computing device capable of receiving and processing input via one or more user interfaces, providing output via one or more user interfaces and communicating input, output, and/or other information to and/or from one or more other computing devices. For example, licensing server 501, licensing server 503, user computing device 520, and user computing device 530 may be a server computer, a desktop computer, laptop computer, tablet computer, smart phone, or the like. In addition, and as illustrated in greater detail below, any and/or all of licensing server 501, licensing server 503, user computing device 520, and user computing device 530 may, in some instances, be special-purpose computing devices configured to perform specific functions.

Computing environment 500 also may include one or more computing platforms. For example, computing environment 500 may include license management computing platform 510. License management computing platform 510 may include one or more computing devices configured to perform one or more of the various functions described herein. For example, license management computing platform 510 may include one or more computers (e.g., laptop computers, desktop computers, servers, etc.).

Computing environment 500 also may include one or more networks, which may interconnect one or more of licensing server 501, licensing server 503, user computing device 520, user computing device 530, and license management computing platform 510. For example, computing environment 500 may include network 505, which may include one or more private networks (which may, e.g., be operated by and/or associated with an organization that operates license management computing platform 510 and which may include one or more local area networks, wide area networks, virtual private networks, etc.) and/or one or more public networks (e.g., the internet).

As illustrated in FIG. 5, license management computing platform 510 may include one or more processors 512, memory 514, and a communication interface 516. Memory 514 may store and/or otherwise include one or more program modules that include instructions that, when executed by the one or more processors 512, cause license management computing platform 510 to perform one or more functions described herein. For example, memory 514 may store and/or otherwise include license management module 518, which may include instructions that, when executed by the one or more processors 512, cause license management computing platform 510 to perform one or more functions described herein. In addition, communication interface 516 may be a network interface configured to support communication between license management computing platform 510 and network 505 and/or one or more sub-networks thereof.

As further illustrated in FIG. 5, user computing device 520 and user computing device 530 may store, execute, and/or otherwise include various software applications and/or application wrappers. For example, user computing device 520 may store, execute, and/or otherwise include a first application 524 that may be wrapped by a first application wrapper 522. In addition, user computing device 520 may store, execute, and/or otherwise include a second application 528 that may be wrapped by a second application wrapper 526. Application wrapper 522 and application wrapper 526 may incorporate and/or implement one or more aspects of secure application wrapper 320, as discussed above. Additionally or alternatively, application 524 and application 528 may be native applications and/or managed applications that may incorporate and/or implement one or more aspects of the managed applications 410 discussed above. For example, application 524 and application 528 may be wrapped applications, and application wrapper 522 and application wrapper 526 may be created, implemented, and/or managed by application management framework 414. In addition, application wrapper 522 and application wrapper 526 may implement and/or provide license management and enforcement functionality and/or payment functionality, as illustrated in greater detail below.

Similarly, user computing device 530 may store, execute, and/or otherwise include a third application 534 that may be wrapped by a third application wrapper 532. In addition, user computing device 530 may store, execute, and/or otherwise include a fourth application 538 that may be wrapped by a fourth application wrapper 536. Application wrapper 532 and application wrapper 536 may incorporate and/or implement one or more aspects of secure application wrapper 320, as discussed above. Additionally or alternatively, application 534 and application 538 may be native applications and/or managed applications that may incorporate and/or implement one or more aspects of the managed applications 410 discussed above. For example, application 534 and application 538 may be wrapped applications, and application wrapper 532 and application wrapper 536 may be created, implemented, and/or managed by application management framework 414. In addition, application wrapper 532 and application wrapper 536 may implement and/or provide license management and enforcement functionality and/or payment functionality, as illustrated in greater detail below.

Figure 6B:
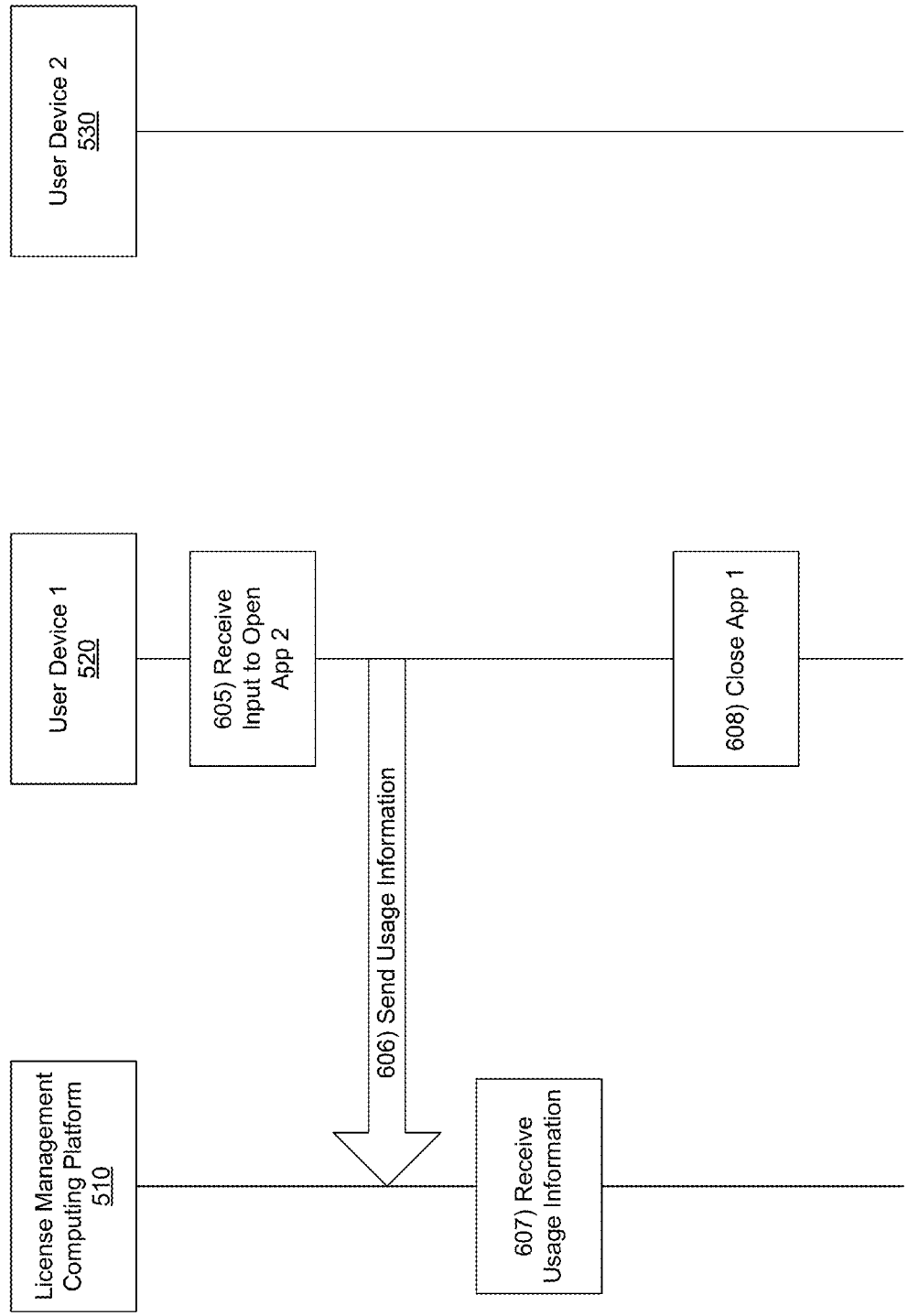

FIGS. 6A-6G depict an example event sequence for enforcing licensing policies using an application wrapper in accordance with one or more example embodiments. Referring to FIG. 6A, at step 601, user computing device 520 may receive input requesting to open a first software application (e.g., application 524). For example, at step 601, user computing device 520 may receive input from the user of user computing device 520 via one or more user interfaces displayed and/or otherwise provided by user computing device 520, and such input may request and/or command user computing device 520 to open application 524. At step 602, user computing device 520 may open the first software application (e.g., application 524). For example, at step 602, user computing device 520 may load, begin executing, display and/or present one or more user interfaces of, and/or otherwise open application 524.

At step 603, user computing device 520 may monitor usage of the first software application (e.g., application 524). For example, at step 603, a first application wrapper (e.g., application wrapper 522) of a first application (e.g., application 524) on a computing device (e.g., user computing device 520) may monitor usage of the first application, and the first application wrapper (e.g., application wrapper 522) of the first application (e.g., application 524) may provide a policy enforcement layer which may exist between the first application (e.g., application 524) and an operating system of the computing device (e.g., user computing device 520) and which may control execution of the first application (e.g., application 524) based on one or more mobile device management policies. For instance, application wrapper 522 may monitor usage of application 524 at runtime (e.g., at the time of execution of the application and/or as the application is executed), and application wrapper 522 may provide a policy enforcement layer that controls how application 524 is executed based on one or more policies, such as mobile device management policies that selectively enable and/or selectively disable specific functions of application 524 and/or user computing device 520 based on device state information for user computing device 520, such as state information indicating where user computing device 520 is currently located, what networks user computing device 520 is currently connected to, what other applications are installed and/or running on user computing device 520, and/or the like. The policy enforcement layer provided by the first application wrapper (e.g., application wrapper 522) may exist between the first application (e.g., application 524) and an operating system of the computing device (e.g., user computing device 520) and may provide a sandbox in which the computing device may execute the first application (e.g., application 524) while keeping the first application insulated from and/or isolated from other programs that may be executed by the computing device. In monitoring usage of application 524, application wrapper 522 may track and/or record information identifying the times at which application 524 and/or one or more user interfaces of application 524 are placed into focus and/or moved out of focus (e.g., on one or more display screens of user computing device 520); information identifying the duration of time for which application 524 and/or one or more user interfaces of application 524 are in focus, interacted with, and/or otherwise used (e.g., by the user of user computing device 520); information identifying the times at which specific functions of application 524 are initiated, executed, and/or otherwise used; information identifying the duration of time for which specific functions of application 524 are executed and/or otherwise used; information identifying the one or more locations at which application 524 and/or one or more specific functions of application 524 are executed and/or otherwise used; and/or other information that may impact, affect, and/or be taken into account by one or more licensing restrictions and/or payment considerations (which may, e.g., be managed and/or enforced by application wrapper 522, as illustrated in greater detail below).

At step 604, user computing device 520 may enforce one or more licensing policies on the first software application (e.g., application 524). For example, at step 604, the first application wrapper (e.g., application wrapper 522) of the first application (e.g., application 524) may enforce one or more licensing policies on the first application (e.g., application 524) at runtime based on the usage of the first application (e.g., application 524). In enforcing the one or more licensing policies on the first application (e.g., application 524) at runtime, application wrapper 522 may selectively enable and/or selectively disable one or more specific functions of application 524, prompt the user of user computing device 520 to provide and/or otherwise request payment for specific and/or continued use of one or more specific functions of application 524, and/or perform other functions, as illustrated in greater detail below.

In some embodiments, the one or more licensing policies may define various terms subject to which the first application may be used. For instance, the one or more licensing policies may define specific times and/or dates at which the first application may be used. Additionally or alternatively, the one or more licensing policies may define specific users that are authorized and/or prohibited from using the first application. Additionally or alternatively, the one or more licensing policies may define specific devices and/or specific types of devices that are authorized and/or prohibited from using the first application. Additionally or alternatively, the one or more licensing policies may define a specific number of devices and/or a specific number of users of an organization that may use the first application at a particular time and/or during a specific time period. Additionally or alternatively, the one or more licensing policies may define one or more billing rates at which usage of the first application may be charged for payment purposes to an organization and/or to specific users of an organization. Additionally or alternatively, the one or more licensing policies may define one or more other license terms and/or payment terms on which authorized usage of the first application may be conditioned.

In some embodiments, the policy enforcement layer may control execution of the first application by intercepting input to the first application, intercepting output from the first application, and intercepting function calls made by the first application. For example, the policy enforcement layer provided by application wrapper 522 may control execution of application 524 by intercepting input to application 524 (e.g., from the user of user computing device 520, from the operating system of user computing device 520, from other applications running on user computing device 520, etc.), by intercepting output from the first application (e.g., to the user of user computing device 520, to the operating system of user computing device 520, to other applications running on user computing device 520, etc.), and/or by intercepting one or more function calls made by application 524.

In some embodiments, in enforcing the one or more licensing policies on the first software application (e.g., application 524), the first application wrapper (e.g., application wrapper 522) may display, cause to be displayed, and/or otherwise present one or more graphical user interfaces. For example, in enforcing one or more licensing policies on application 524 at step 604, application wrapper 522 may cause user computing device 520 to display and/or otherwise present one or more of the example graphical user interfaces illustrated in FIGS. 7-14 and/or discussed in greater detail below.

Figure 7:
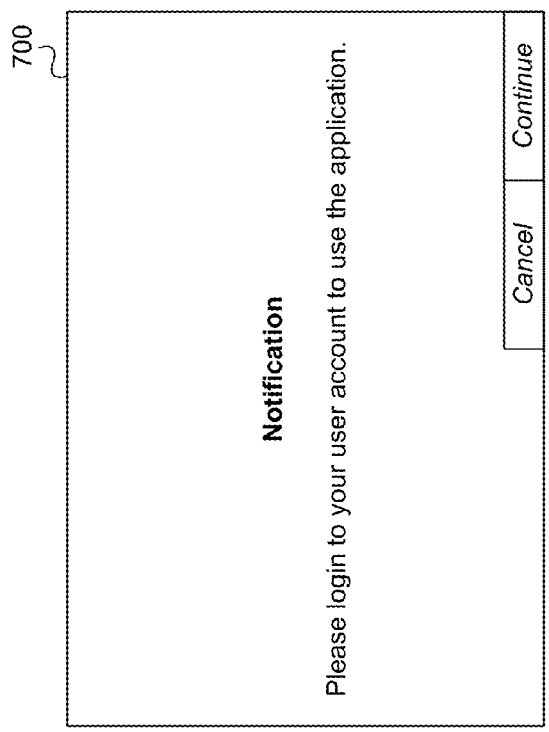

For example, in enforcing one or more licensing policies on application 524 at step 604, application wrapper 522 may cause user computing device 520 to display and/or otherwise present a graphical user interface similar to graphical user interface 700, which is illustrated in FIG. 7. As seen in FIG. 7, graphical user interface 700 may include text and/or other information prompting the user of user computing device 520 to login to a user account to interact with and/or otherwise use a specific application (e.g., application 524). By requiring the user of user computing device 520 to login to a user account before using application 524, application wrapper 522 may be able to enforce licensing policies and/or track usage for licensing and/or payment purposes on a per-user basis.

Figure 8:
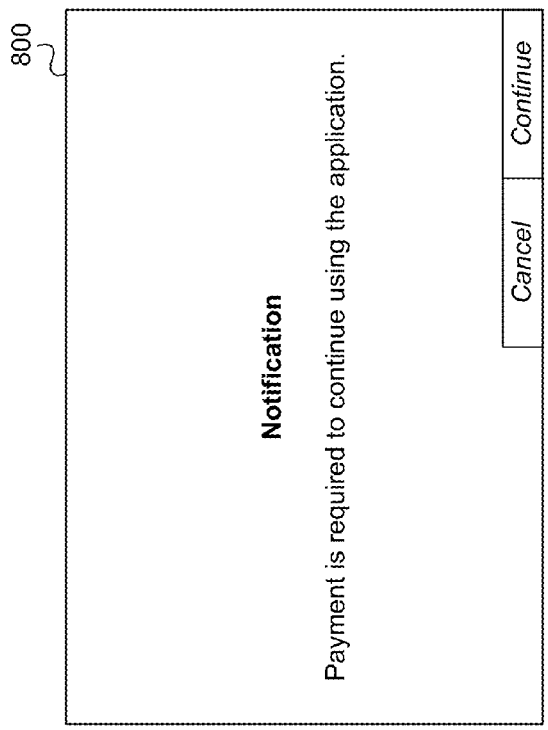
FIGS. 7-14 depict example graphical user interfaces for enforcing licensing policies using an application wrapper in accordance with one or more example embodiments.

As another example, in enforcing one or more licensing policies on application 524 at step 604, application wrapper 522 may cause user computing device 520 to display and/or otherwise present a graphical user interface similar to graphical user interface 800, which is illustrated in FIG. 8. As seen in FIG. 8, graphical user interface 800 may include text and/or other information notifying the user of user computing device 520 that payment is required to continue using application 524 and/or one or more specific functions of application 524.

Figure 9:
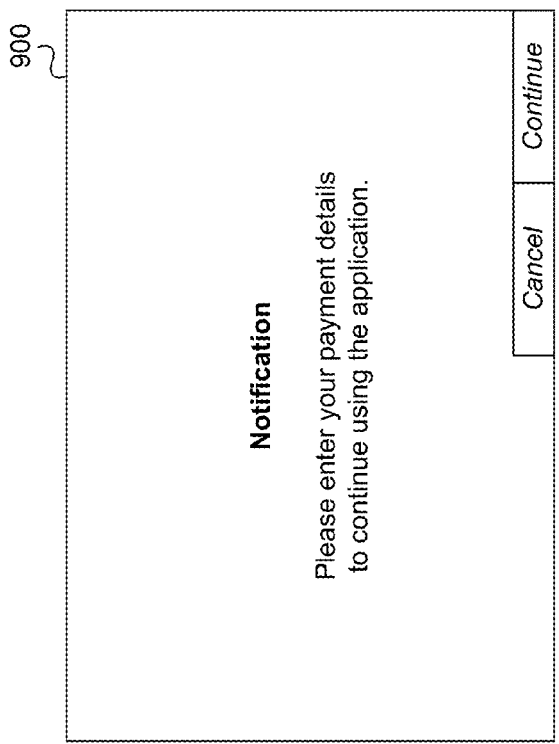

As another example, in enforcing one or more licensing policies on application 524 at step 604, application wrapper 522 may cause user computing device 520 to display and/or otherwise present a graphical user interface similar to graphical user interface 900, which is illustrated in FIG. 9. As seen in FIG. 9, graphical user interface 900 may include text and/or other information prompting the user of user computing device 520 to enter payment details, such as a credit card number and/or other payment-related information, to continue using application 524 and/or one or more specific functions of application 524.

Figure 10:
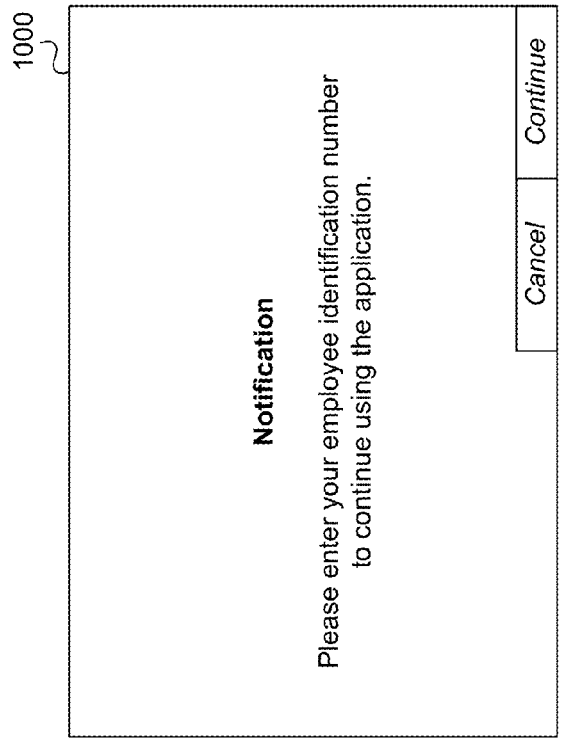

As another example, in enforcing one or more licensing policies on application 524 at step 604, application wrapper 522 may cause user computing device 520 to display and/or otherwise present a graphical user interface similar to graphical user interface 1000, which is illustrated in FIG. 10. As seen in FIG. 10, graphical user interface 1000 may include text and/or other information prompting the user of user computing device 520 to enter an employee identification number and/or other identifying details to be used for payment purposes to continue using application 524 and/or one or more specific functions of application 524.

Figure 11:
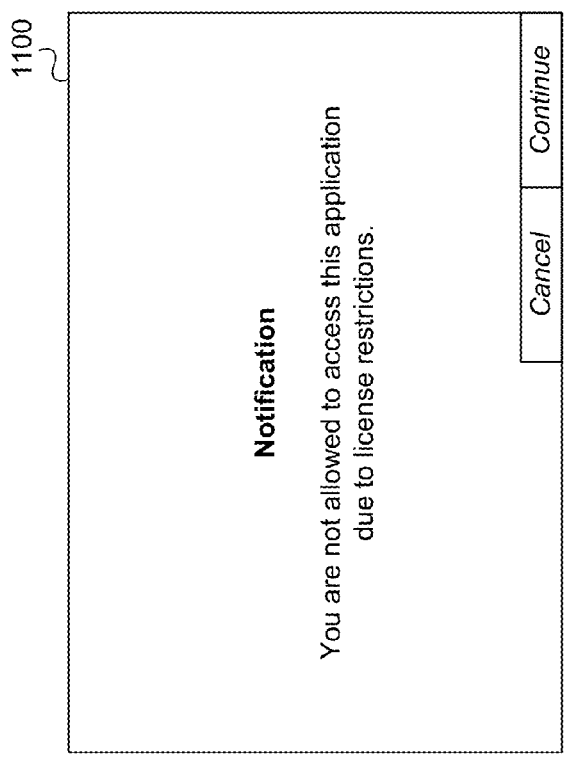

As another example, in enforcing one or more licensing policies on application 524 at step 604, application wrapper 522 may cause user computing device 520 to display and/or otherwise present a graphical user interface similar to graphical user interface 1100, which is illustrated in FIG. 11. As seen in FIG. 11, graphical user interface 1100 may include text and/or other information notifying the user of user computing device 520 that access to application 524 is prohibited due to one or more licensing policies and/or other license-related restrictions (which may, e.g., be enforced by application wrapper 522).

Figure 12:
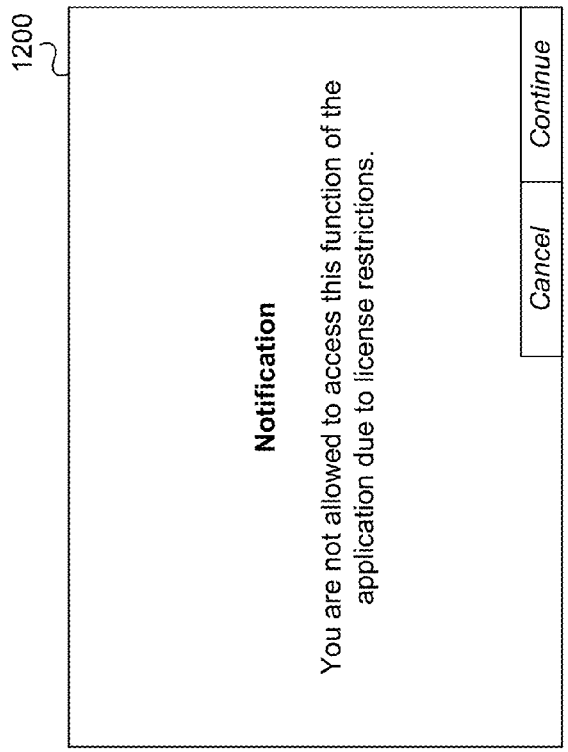

As another example, in enforcing one or more licensing policies on application 524 at step 604, application wrapper 522 may cause user computing device 520 to display and/or otherwise present a graphical user interface similar to graphical user interface 1200, which is illustrated in FIG. 12. As seen in FIG. 12, graphical user interface 1200 may include text and/or other information notifying the user of user computing device 520 that access to one or more specific functions of application 524 is prohibited due to one or more licensing policies and/or other license-related restrictions (which may, e.g., be enforced by application wrapper 522).

Figure 13:
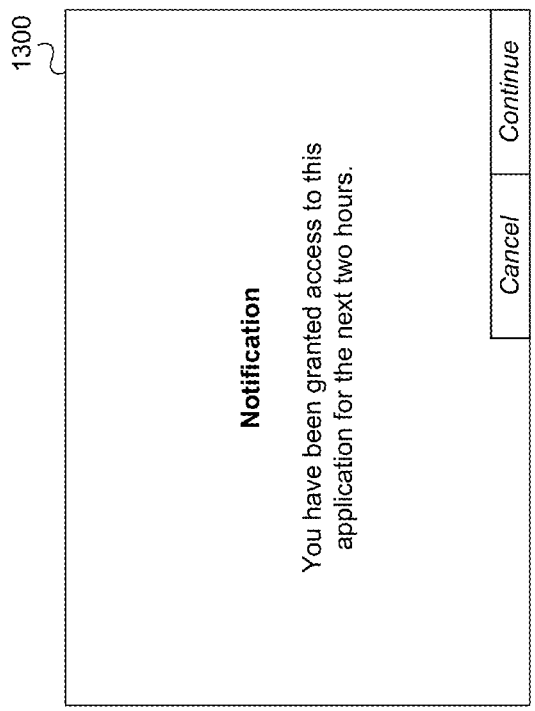

As another example, in enforcing one or more licensing policies on application 524 at step 604, application wrapper 522 may cause user computing device 520 to display and/or otherwise present a graphical user interface similar to graphical user interface 1300, which is illustrated in FIG. 13. As seen in FIG. 13, graphical user interface 1300 may include text and/or other information notifying the user of user computing device 520 that access to application 524 has been granted for a limited period of time (e.g., for the next two hours) in accordance with one or more applicable licensing policies and/or other license-related restrictions (which may, e.g., be enforced by application wrapper 522).

Figure 14:
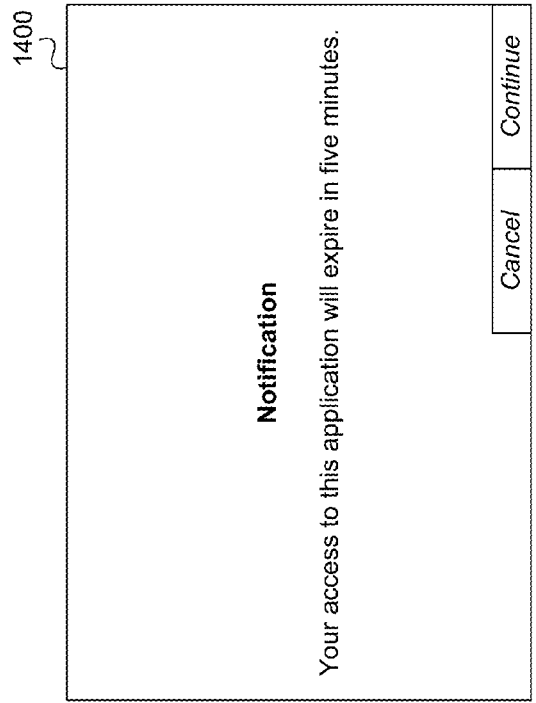

As another example, in enforcing one or more licensing policies on application 524 at step 604, application wrapper 522 may cause user computing device 520 to display and/or otherwise present a graphical user interface similar to graphical user interface 1400, which is illustrated in FIG. 14. As seen in FIG. 14, graphical user interface 1400 may include text and/or other information notifying the user of user computing device 520 that access to application 524 is about to expire at a particular time (e.g., in five minutes) in accordance with one or more applicable licensing policies and/or other license-related restrictions (which may, e.g., be enforced by application wrapper 522).

In some embodiments, enforcing the one or more licensing policies on the first application at runtime may include allowing the first application to be used based on validating a license for the first application. For example, in enforcing one or more licensing policies on application 524 (e.g., at step 604), application wrapper 522 may validate a license for application 524 and accordingly may allow and/or otherwise permit application 524 to be used (e.g., by the user of user computing device 520) based on validating the license for application 524 (e.g., without requiring additional payment for usage of the application). In validating the license for application 524, application wrapper 522 may, for example, access and/or load licensing information and subsequently may determine, based on such licensing information, that user computing device 520 and/or the user of user computing device 520 has a valid license for application 524 and/or that user computing device 520 and/or the user of user computing device 520 is otherwise authorized to use application 524. In some instances, after validating a license for the first application, the application wrapper may allow the first application to be used indefinitely or for a limited amount of time (e.g., based on the validated license for the first application). For example, in some instances, after validating a license for application 524, application wrapper 522 may allow and/or otherwise permit application 524 to be used indefinitely by the user of user computing device 520 based on the validated license for application 524 allowing for and/or otherwise providing for such indefinite usage of application 524. Alternatively, in other instances, after validating a license for application 524, application wrapper 522 may allow and/or otherwise permit application 524 to be used for a limited amount of time (e.g., one hour, four hours, one day, one week, etc.) by the user of user computing device 520 based on the validated license for application 524 allowing for and/or otherwise providing for such limited usage of application 524.

In some embodiments, enforcing the one or more licensing policies on the first application at runtime may include preventing the first application from being used. For example, in enforcing one or more licensing policies on application 524 (e.g., at step 604), application wrapper 522 may prevent application 524 from being used (e.g., if application wrapper 522 determines that user computing device 520 does not have a valid license to use application 524, if application wrapper 522 determines that the user of user computing device 520 does not have a valid license to use application 524, etc.). In some instances, after preventing the first application from being used, the application wrapper (e.g., application wrapper 522) may prompt the user (e.g., the user of user computing device 520) to enter payment information to pay for usage of the first application (e.g., by causing one or more of the example user interfaces discussed above to be presented and/or displayed to the user of user computing device 520).

In some embodiments, enforcing the one or more licensing policies on the first application at runtime may include prompting a user of the computing device to provide payment information. For example, in enforcing one or more licensing policies on application 524 (e.g., at step 604), application wrapper 522 may prompt the user of user computing device 520 to enter and/or otherwise provide payment information. In prompting the user of user computing device 520 to enter and/or otherwise provide payment information, application wrapper 522 may cause user computing device 520 to display and/or otherwise present a user interface that prompts the user of user computing device 520 to enter payment details, such as credit card information, an employee identification number, and/or other information that may be used to initiate and/or complete a payment for usage of application 524 by the user of user computing device 520. For instance, in prompting the user of user computing device 520 in this manner, application wrapper 522 may cause user computing device 520 to display and/or otherwise present one or more of the example user interfaces discussed above. Additionally or alternatively, the computing device (e.g., user computing device 520) may receive input from the user of the computing device (e.g., user computing device 520) that includes such payment information after presenting such a prompt and/or via one or more user interfaces presented in connection with the prompt.

In some embodiments, enforcing the one or more licensing policies on the first application at runtime may include generating billing information based on the usage of the first application. For example, in enforcing one or more licensing policies on application 524 (e.g., at step 604), application wrapper 522 may generate billing information based on the usage of application 524. Such billing information may, for instance, indicate and/or identify an amount of money to be paid for the usage of the first application on user computing device 520 and/or by the user of 520. Additionally or alternatively, application wrapper 522 may generate the billing information, for instance, by multiplying a tracked usage time and/or tracked usage amount of application 524 by one or more applicable usage rates for application 524.

In some embodiments, usage of a first function of the first application may be billed at a first billing rate, and usage of a second function of the first application may be billed at a second billing rate different from the first billing rate. In addition, the first application wrapper of the first application may track the usage of the first function of the first application and the usage of the second function of the first application to generate the billing information. For example, usage of a first function of application 524 may be billed at a first billing rate, and usage of a second function of application 524 may be billed at a second billing rate different from the first billing rate. In addition, application wrapper 522 may track the usage of the first function of application 524 and the usage of the second function of application 524 to generate the billing information. In this manner, different functions of the first application (e.g., application 524) may be billed at different rates, and the application wrapper (e.g., application wrapper 522) may track which function is being used for billing purposes, for instance.

In some instances, the billing rate for a particular application may be dynamic, such that the billing rate applied to usage of a particular application by a particular user may vary over time. For example, the billing rate for usage of application 524 may be dynamic, and as application 524 is used by the user of user computing device 520, the billing rate may vary over time. In some instances, the billing rate may vary based on an equation or formula. For example, as the user of user computing device 520 uses application 524 over a period of time, the billing rate may decrease (e.g., such that the longer the user uses the application, the lower the hourly rate that might be charged for usage of the application). Additionally or alternatively, time windows may be used to set prices and/or otherwise specify how the billing rate may vary over time. For example, usage of an application (e.g., application 524) during peak hours (e.g., 9:00 am to 5:00 pm) may be billed at a relatively higher billing rate than usage of the application (e.g., application 524) during off-peak hours (e.g., 5:01 pm to 8:59 am). Additionally or alternatively, server usage may be taken into account in determining a billing rate and/or may otherwise cause the billing rate for an application to vary over time. For example, if application 524 interacts with a server while application 524 is being used by the user of user computing device 520, usage of application 524 may be billed at a first, relatively higher billing rate at times when the server is relatively busy (e.g., when server usage and/or bandwidth is above one or more predetermined threshold(s)), and usage of application 524 may be billed at a second, relatively lower billing rate at times when the server is relatively less busy (e.g., when server usage and/or bandwidth is less than or equal to the one or more predetermined threshold(s)).

In some instances, a limited number of licenses for a particular software application may be available to all users of a particular organization or all users of a particular department within an organization. In these instances, in enforcing the one or more licensing policies on an application, an application wrapper may determine if one of the limited number of licenses is available for use by a particular user. If such a license is available, then the user may be permitted to use the application, and if such a license is not available, then the user may be placed in a queue to use the application once a license becomes available (e.g., after another user ceases using the application). For example, in enforcing one or more licensing policies on application 524, application wrapper 522 may determine if one of a limited number of licenses is available for use by the user of user computing device 520. The limited number of licenses may, for example, be maintained by an enterprise organization associated with the user of user computing device 520, such as an organization that is the employer of the user of user computing device 520. If application wrapper 522 determines that a license to application 524 is available, then application wrapper 522 may permit the user of user computing device 520 to use application 524. Alternatively, if application wrapper 522 determines that a license to application 524 is not available, then application wrapper 522 may place the user of user computing device 520 in a queue to use application 524 once a license becomes available (e.g., after another user on another computing device ceases using the same application). In some instances, after the user is placed in the queue and a license becomes available, the application wrapper may present a notification (e.g., a pop-up message displayed on screen to alert the user of the computing device that a license is available for use) and/or an email notification may be sent to the user. In addition, after the license becomes available, the user may, in some instances, have a limited amount of time to begin using the application under the license before the license is reassigned to the next user in the queue.

In some embodiments, usage of the first application by a first user may be billed at a first billing rate, and usage of the first application by a second user may be billed at a second billing rate different from the first billing rate. In addition, the first application wrapper of the first application may track the usage of the first application by the first user and the usage of the first application by the second user to generate the billing information. For example, usage of application 524 by a first user may of user computing device 520 be billed at a first billing rate, and usage of application 524 by a second user of user computing device 520 different from the first user may be billed at a second billing rate different from the first billing rate. In addition, application wrapper 522 may track the usage of application 524 by the first user and the usage of application 524 by the second user to generate the billing information. In this manner, different users of the first application (e.g., application 524) may be subject to different billing rates, and the application wrapper (e.g., application wrapper 522) may track which user is using the first application (e.g., application 524). In some instances, tracking usage of different users may be performed by the application wrapper for different users on the same device (which may, e.g., be used by different users). In other instances, tracking usage of different users may be performed by different application wrappers on different devices (which may, e.g., be used by different users) that may still be running the same application, for instance.

In some embodiments, usage of the first application by a first user may be billed to a first division of an enterprise organization associated with the one or more mobile device management policies, and usage of the first application by a second user may be billed to a second division of the enterprise organization different from the first division of the enterprise organization. In addition, the first application wrapper of the first application may track the usage of the first application by the first user and the usage of the first application by the second user to generate the billing information. For example, usage of application 524 by a first user of user computing device 520 may be billed to a first division of an enterprise organization (which may, e.g., be the employer of the first user of user computing device 520 and/or which may develop, distribute, and/or require enforcement of the one or more mobile device management policies on user computing device 520 and/or on the first user of user computing device 520), and usage of application 524 by a second user of user computing device 520 different from the first user may be billed to a second division of the enterprise organization different from the first division. In addition, application wrapper 522 may track the usage of application 524 by the first user and the usage of application 524 by the second user to generate the billing information. In this manner, usage of the first application (e.g., application 524) by different users may be billed to different departments and/or other divisions of an enterprise organization, and the application wrapper (e.g., application 524) may track which user is using the first application (e.g., application 524) so as to generate the billing information for the appropriate division(s) of the enterprise organization.

Referring to FIG. 6B, at step 605, user computing device 520 may receive input requesting to open a second software application (e.g., application 528). For example, at step 605, user computing device 520 may receive input from the user of user computing device 520 via one or more user interfaces displayed and/or otherwise provided by user computing device 520, and such input may request and/or command user computing device 520 to open application 528.

At step 606, user computing device 520 may send usage information to license management computing platform 510. For example, at step 606, the first application wrapper (e.g., application wrapper 522) of the first application (e.g., application 524) may provide usage information to a license management server (e.g., license management computing platform 510) that is configured to generate billing information based on the usage information, and the usage information may identify the monitored usage of the first application (e.g., application 524). For instance, application wrapper 522 may send usage information for application 524 to license management computing platform 510 so as to enable license management computing platform 510 to generate billing information for the usage of application 524 by the user of user computing device 520, as illustrated in greater detail below.

At step 607, license management computing platform 510 may receive the usage information from user computing device 520. For example, at step 607, license management computing platform 510 may receive, via communication interface 516, first usage information from a first application wrapper (e.g., application wrapper 522) of a first application (e.g., application 524) on a first computing device (e.g., user computing device 520) that is used by a first enterprise user of an enterprise organization. As illustrated in greater detail below, license management computing platform 510 may use the first usage information in various ways, such as in generating billing information for usage of the first application (e.g., application 524) on the first computing device (e.g., user computing device 520). At step 608, user computing device 520 may close the first software application (e.g., application 524). For example, at step 608, user computing device 520 may suspend, quit, and/or otherwise close application 524.

Referring to FIG. 6C, at step 609, user computing device 520 may open the second software application (e.g., application 528). For example, at step 609, user computing device 520 may load, begin executing, display and/or present one or more user interfaces of, and/or otherwise open application 528.

At step 610, user computing device 520 may monitor usage of the second software application (e.g., application 528). For example, at step 610, a second application wrapper (e.g., application wrapper 526) of a second application (e.g., application 528) on the computing device may monitor usage of the second application, and the second application wrapper (e.g., application wrapper 526) of the second application (e.g., application 528) may provide a second policy enforcement layer which may exist between the second application (e.g., application 528) and the operating system of the computing device (e.g., user computing device 520) and which may control execution of the second application (e.g., application 528) based on a second set of one or more mobile device management policies. For instance, application wrapper 526 may monitor usage of application 528 at runtime (e.g., at the time of execution of the application and/or as the application is executed), and application wrapper 526 may provide a policy enforcement layer that controls how application 528 is executed based on one or more policies, such as mobile device management policies that selectively enable and/or selectively disable specific functions of application 528 and/or user computing device 520 based on device state information for user computing device 520, such as state information indicating where user computing device 520 is currently located, what networks user computing device 520 is currently connected to, what other applications are installed and/or running on user computing device 520, and/or the like. Like the policy enforcement layer provided by the first application wrapper, the policy enforcement layer provided by the second application wrapper (e.g., application wrapper 526) may exist between the second application (e.g., application 528) and the operating system of the computing device (e.g., user computing device 520). In addition, the policy enforcement layer provided by the second application wrapper (e.g., application wrapper 526) may provide a sandbox in which the computing device may execute the second application (e.g., application 528) while keeping the second application insulated from and/or isolated from other programs that may be executed by the computing device. In some instances, the second set of one or more mobile device management policies that may be enforced by and/or otherwise used by application wrapper 526 may be the same as or include some of the same policies as those enforced on the first application (e.g., application 524) by the first application wrapper (e.g., application wrapper 522). In other instances, the second set of one or more mobile device management policies that may be enforced by and/or otherwise used by application wrapper 526 may be different from or include one or more different policies than those enforced on the first application (e.g., application 524) by the first application wrapper (e.g., application wrapper 522).

In monitoring usage of application 528, application wrapper 526 may track and/or record information identifying the times at which application 528 and/or one or more user interfaces of application 528 are placed into focus and/or moved out of focus (e.g., on one or more display screens of user computing device 520); information identifying the duration of time for which application 528 and/or one or more user interfaces of application 528 are in focus, interacted with, and/or otherwise used (e.g., by the user of user computing device 520); information identifying the times at which specific functions of application 528 are initiated, executed, and/or otherwise used; information identifying the duration of time for which specific functions of application 528 are executed and/or otherwise used; information identifying the one or more locations at which application 528 and/or one or more specific functions of application 528 are executed and/or otherwise used; and/or other information that may impact, affect, and/or be taken into account by one or more licensing restrictions and/or payment considerations (which may, e.g., be managed and/or enforced by application wrapper 526, as illustrated in greater detail below).

At step 611, user computing device 520 may enforce one or more licensing policies on the second software application (e.g., application 528). For example, at step 611, the second application wrapper (e.g., application wrapper 526) of the second application (e.g., application 528) may enforce a second set of one or more licensing policies on the second application (e.g., application 528) at runtime based on the usage of the second application (e.g., application 528). In enforcing the second set of one or more licensing policies on the second application (e.g., application 528) at runtime, application wrapper 526 may selectively enable and/or selectively disable one or more specific functions of application 528, prompt the user of user computing device 520 to provide and/or otherwise request payment for specific and/or continued use of one or more specific functions of application 528, and/or perform other functions, similar to how application wrapper 522 may enforce one or more licensing policies on application 524, as discussed in greater detail above. Additionally or alternatively, in enforcing licensing policies on application 528, application wrapper 526 may cause user computing device 520 to display and/or otherwise present similar user interfaces as application wrapper 522 may cause user computing device 520 to display and/or otherwise present in enforcing licensing policies on application 524. These arrangements advantageously may provide the user of user computing device 520 and/or one or more administrative users (who may, e.g., administer the licensing policies and/or manage various user devices, including user computing device 520, for an enterprise organization) with a consistent user experience, even though they may be using different software applications that may be created, distributed, and/or otherwise provided by different software application developers. In some instances, the second set of one or more licensing policies that may be enforced by and/or otherwise used by application wrapper 526 may be the same as or include some of the same policies as those enforced on the first application (e.g., application 524) by the first application wrapper (e.g., application wrapper 522). In other instances, the second set of one or more licensing policies that may be enforced by and/or otherwise used by application wrapper 526 may be different from or include one or more different licensing policies than those enforced on the first application (e.g., application 524) by the first application wrapper (e.g., application wrapper 522).

At step 612, user computing device 520 may receive input requesting to close the second software application (e.g., application 528). For example, at step 612, user computing device 520 may receive input from the user of user computing device 520 via one or more user interfaces displayed and/or otherwise provided by user computing device 520, and such input may request and/or commands user computing device 520 to close application 528.

Figure 6D:
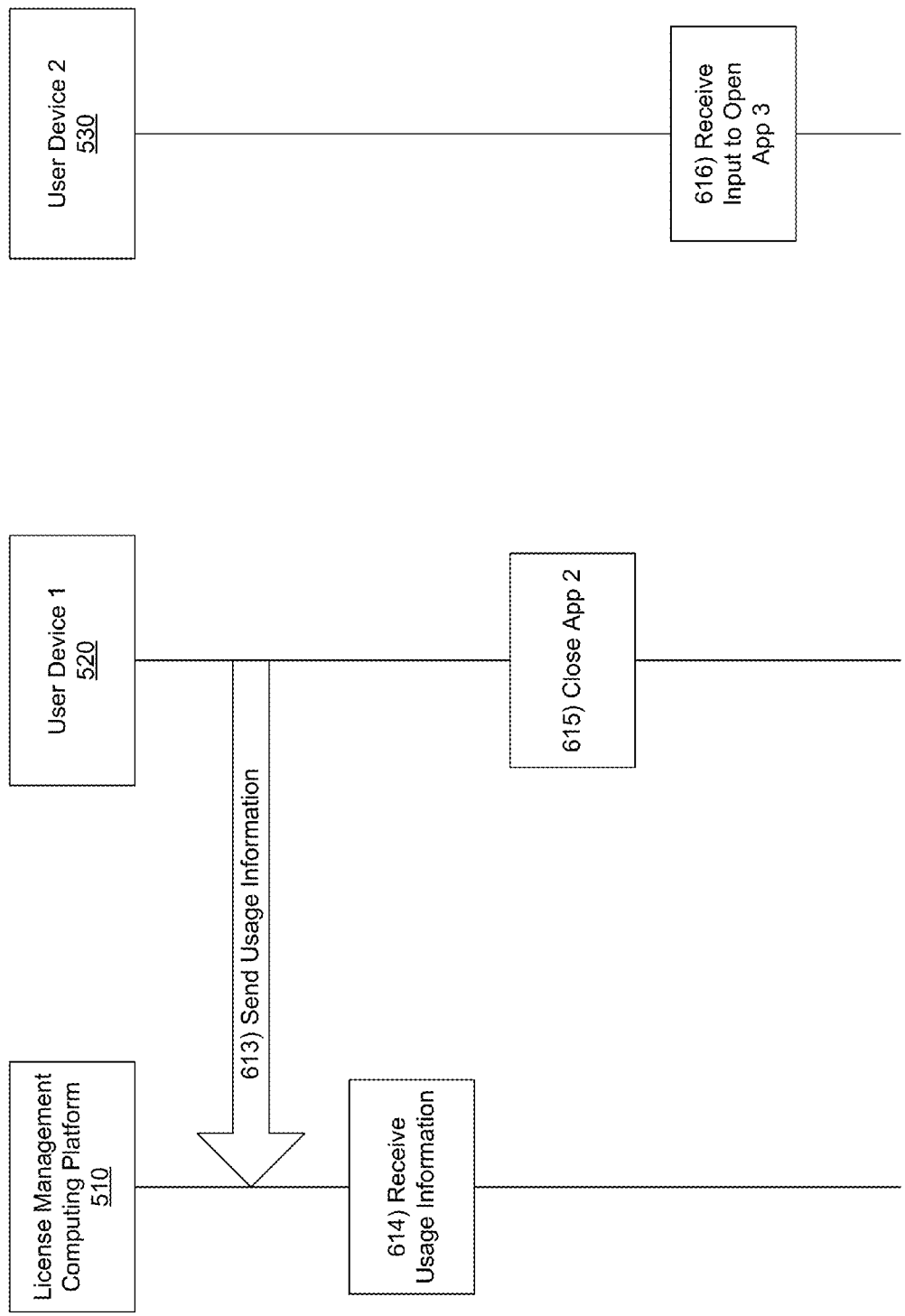

Referring to FIG. 6D, at step 613, user computing device 520 may send usage information to license management computing platform 510. For example, at step 613, the second application wrapper (e.g., application wrapper 526) of the second application (e.g., application 528) may provide usage information to the license management server (e.g., license management computing platform 510). For instance, application wrapper 526 may send usage information for application 528 to license management computing platform 510 so as to enable license management computing platform 510 to generate billing information for the usage of application 528 by the user of user computing device 520, as illustrated in greater detail below. At step 614, license management computing platform 510 may receive the usage information from user computing device 520. At step 615, user computing device 520 may close the second software application (e.g., application 528). For example, at step 615, user computing device 520 may suspend, quit, and/or otherwise close application 528.

Figure 6E:
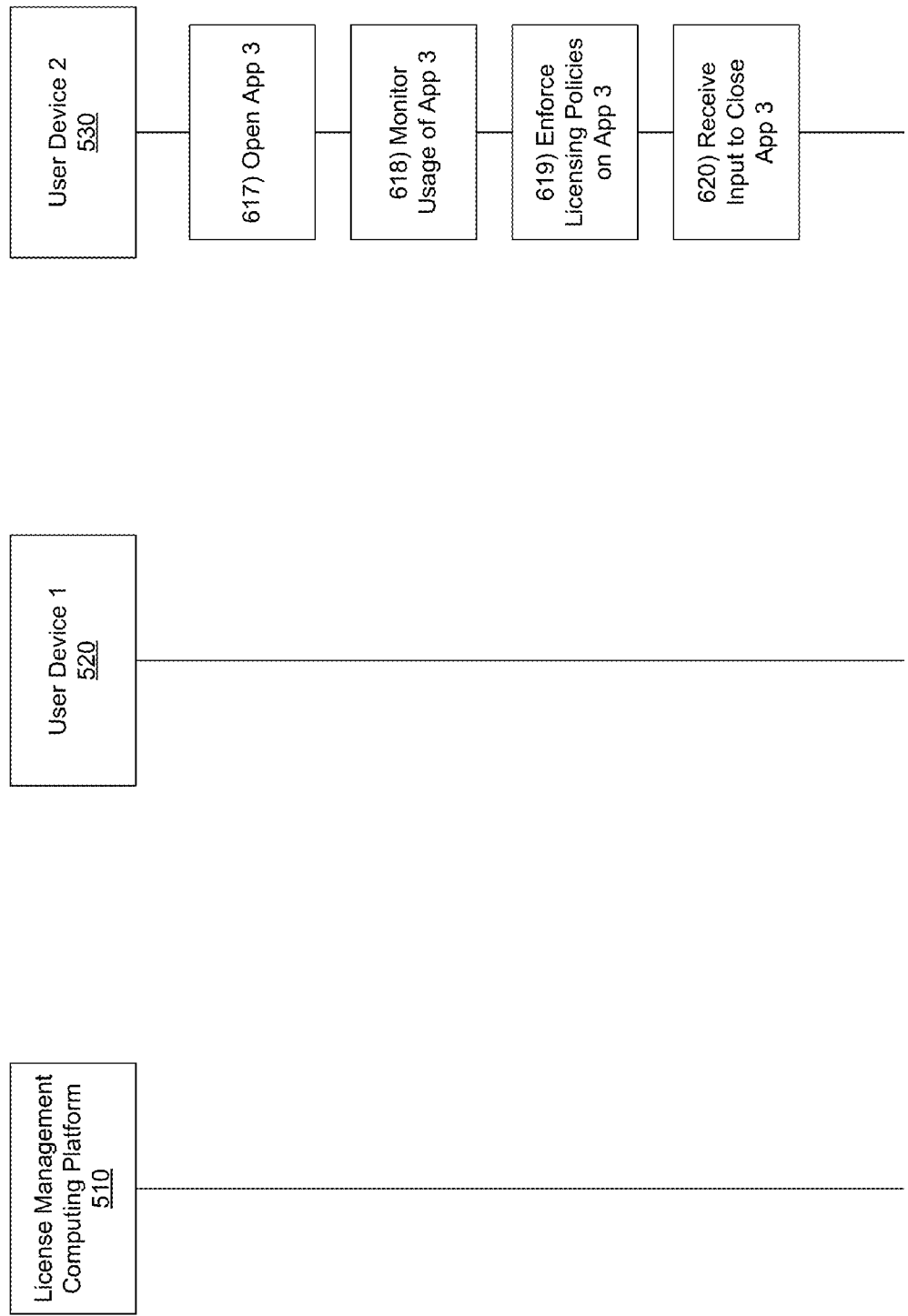

At step 616, user computing device 530 may receive input requesting to open a third software application (e.g., application 534). For example, at step 616, user computing device 530 may receive input from the user of user computing device 530 via one or more user interfaces displayed and/or otherwise provided by user computing device 530, and such input may request and/or command user computing device 530 to open application 534. Referring to FIG. 6E, at step 617, user computing device 530 may open the third software application (e.g., application 534). For example, at step 617, user computing device 530 may load, begin executing, display and/or present one or more user interfaces of, and/or otherwise open application 534.

At step 618, user computing device 530 may monitor usage of the third software application (e.g., application 534). For example, at step 618, an application wrapper (e.g., application wrapper 532) may monitor usage of the third application (e.g., application 534), and like the application wrappers discussed above, the application wrapper (e.g., application wrapper 532) may provide a policy enforcement layer which may exist between the third application (e.g., application 534) and an operating system of the computing device (e.g., user computing device 530) and which may control execution of the third application (e.g., application 534). Like the policy enforcement layers provided by the application wrappers discussed above, the policy enforcement layer provided by application wrapper 532 may exist between application 534 and the operating system of user computing device 530, and further may provide a sandbox in which user computing device 530 may execute application 534 while keeping application 534 insulated from and/or isolated from one or more other programs that may be executed by user computing device 530. In addition, in monitoring usage of application 534, application wrapper 532 may, like the application wrappers discussed above, track and/or record information identifying the times at which application 534 and/or one or more user interfaces of application 534 are placed into focus and/or moved out of focus (e.g., on one or more display screens of user computing device 520); information identifying the duration of time for which application 534 and/or one or more user interfaces of application 534 are in focus, interacted with, and/or otherwise used (e.g., by the user of user computing device 530); information identifying the times at which specific functions of application 534 are initiated, executed, and/or otherwise used; information identifying the duration of time for which specific functions of application 534 are executed and/or otherwise used; information identifying the one or more locations at which application 534 and/or one or more specific functions of application 534 are executed and/or otherwise used; and/or other information that may impact, affect, and/or be taken into account by one or more licensing restrictions and/or payment considerations (which may, e.g., be managed and/or enforced by application wrapper 532.

At step 619, user computing device 530 may enforce one or more licensing policies on the third software application (e.g., application 534). For example, at step 619, application wrapper 532 may enforce one or more licensing policies on application 534 at runtime based on the usage of application 534. In enforcing the one or more licensing policies on application 534, application wrapper 532 may, like the application wrappers discussed above, selectively enable and/or selectively disable one or more specific functions of application 534, prompt the user of user computing device 530 to provide and/or otherwise request payment for specific and/or continued use of one or more specific functions of application 534, and/or perform other functions.

Figure 6F:
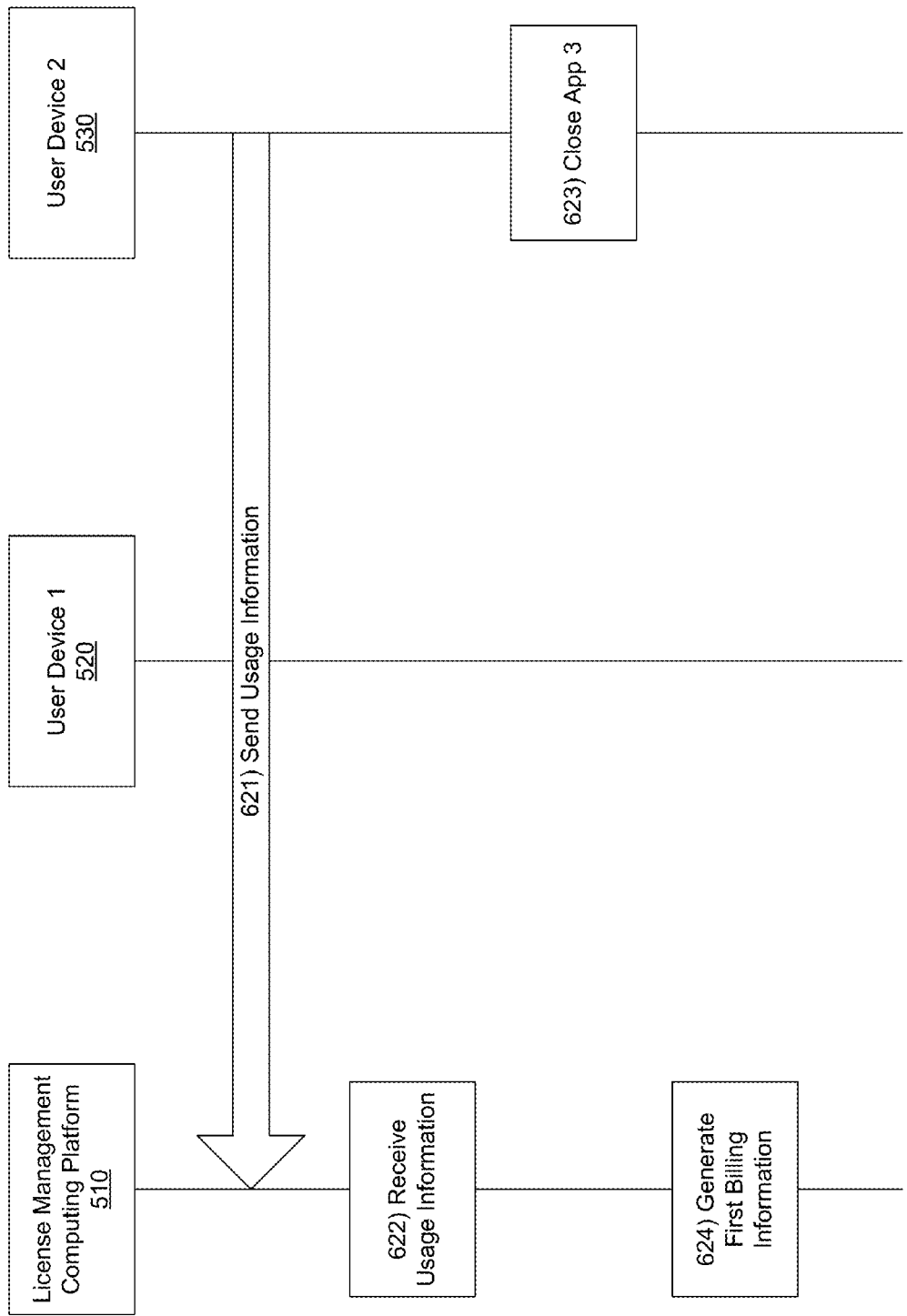

At step 620, user computing device 530 may receive input requesting to close the third software application (e.g., application 534). For example, at step 620, user computing device 530 may receive input from the user of user computing device 530 via one or more user interfaces displayed and/or otherwise provided by user computing device 530, and such input may request and/or command user computing device 530 to close application 534. Referring to FIG. 6F, at step 621, user computing device 530 may send usage information to license management computing platform 510. For example, at step 621, application wrapper 532 may send usage information for application 534 to license management computing platform 510 so as to enable license management computing platform 510 to generate billing information for the usage of application 534 by the user of user computing device 530, as illustrated in greater detail below.

At step 622, license management computing platform 510 may receive the usage information from user computing device 530. For example, at step 622, license management computing platform 510 may receive, via communication interface 516, second usage information from a second application wrapper (e.g., application wrapper 532) of a second application (e.g., application 534) on a second computing device (e.g., user computing device 530) used by a second enterprise user of the enterprise organization. As illustrated in greater detail below, license management computing platform 510 may use the second usage information in various ways, such as in generating billing information for usage of the second application (e.g., application 534) on the second computing device (e.g., user computing device 530). At step 623, user computing device 530 may close the third software application (e.g., application 534). For example, at step 623, user computing device 530 may suspend, quit, and/or otherwise close application 534.

At step 624, license management computing platform 510 may generate first billing information. For example, at step 624, license management computing platform 510 may generate first billing information based on the first usage information received from user computing device 520. In generating the first billing information, license management computing platform 510 may, for instance, determine a monetary amount due for usage of one or more applications on the first computing device (e.g., user computing device 520). License management computing platform 510 may, for example, determine such a monetary amount by multiplying a tracked usage time and/or tracked usage amount of one or more applications (e.g., application 524) by one or more applicable usage rates for the one or more applications (e.g., application 524). The usage rates (e.g., for application 524) may, for instance, be stored and/or maintained by license management computing platform 510 for use in determining, creating, and/or otherwise generating billing information or alternatively may be stored and/or maintained by one or more other computing devices that license management computing platform 510 may access for purposes of identifying and/or otherwise determining the usage rates, such as licensing server 501 and/or licensing server 503.

Referring to FIG. 6G, at step 625, license management computing platform 510 may generate second billing information. For example, at step 625, license management computing platform 510 may generate second billing information based on the second usage information received from user computing device 530. In generating the second billing information, license management computing platform 510 may, for instance, determine a monetary amount due for usage of one or more applications on the second computing device (e.g., user computing device 530). License management computing platform 510 may, for example, determine such a monetary amount by multiplying a tracked usage time and/or tracked usage amount of one or more applications (e.g., application 534) by one or more applicable usage rates for the one or more applications (e.g., application 534). The usage rates (e.g., for application 534) may, for instance, be stored and/or maintained by license management computing platform 510 for use in determining, creating, and/or otherwise generating billing information or alternatively may be stored and/or maintained by one or more other computing devices that license management computing platform 510 may access for purposes of identifying and/or otherwise determining the usage rates, such as licensing server 501 and/or licensing server 503.

At step 626, license management computing platform 510 may create a billing report. For example, at step 626, license management computing platform 510 may compile the first billing information and the second billing information into a billing report to create the billing report. The billing report may, for example, include information about the usage of various applications (e.g., application 524, application 528, application 534, application 538) on various computing devices (e.g., user computing device 520, user computing device 530) and/or information about one or more monetary amounts that may be due to one or more software developers and/or other entities as a result of such usage. Any and/or all of this information may include and/or be determined by license management computing platform 510 based on the usage information received from various computing devices (e.g., user computing device 520, user computing device 530) and/or based on the billing information generated by license management computing platform 510 and/or received from various computing devices (e.g., user computing device 520, user computing device 530).

At step 627, license management computing platform 510 may provide the billing report to one or more administrative devices and/or one or more administrative users. For example, at step 627, license management computing platform 510 may provide, via communication interface 516, the billing report to a third computing device used by an administrative user of the enterprise organization. For instance, license management computing platform 510 may provide the billing report to such a computing device by publishing, sending, electronically transmitting, and/or otherwise communicating the billing report to the computing device. In addition, the computing device to which license management computing platform 510 may send the billing report may be used by an administrative user of the enterprise organization who may, for instance, be responsible for managing software applications on various computing devices (e.g., user computing device 520, user computing device 530) that may be used by employees and/or other entities associated with the organization. By sending the billing report to such a computing device and/or to such an administrative user, license management computing platform 510 may enable the administrative user to review the usage information and/or the billing information and subsequently pay any monetary amounts that may be due to one or more software developers and/or other entities in connection with the application usage. Advantageously, license management computing platform 510 may, in some instances, present in a single report billing information for usage of different software applications (e.g., application 524, application 528, application 534, application 538) that may be developed and/or licensed by different entities and/or used by different users on different computing devices (e.g., user computing device 520, user computing device 530), such that an administrative user does not have to review multiple separate reports for individual applications and/or individual users and/or individual devices. By compiling the billing information and/or usage information in this way, for example, license management computing platform 510 may simplify the task of administering and/or managing different applications on different devices for administrative users of an enterprise organization.

Figure 15:
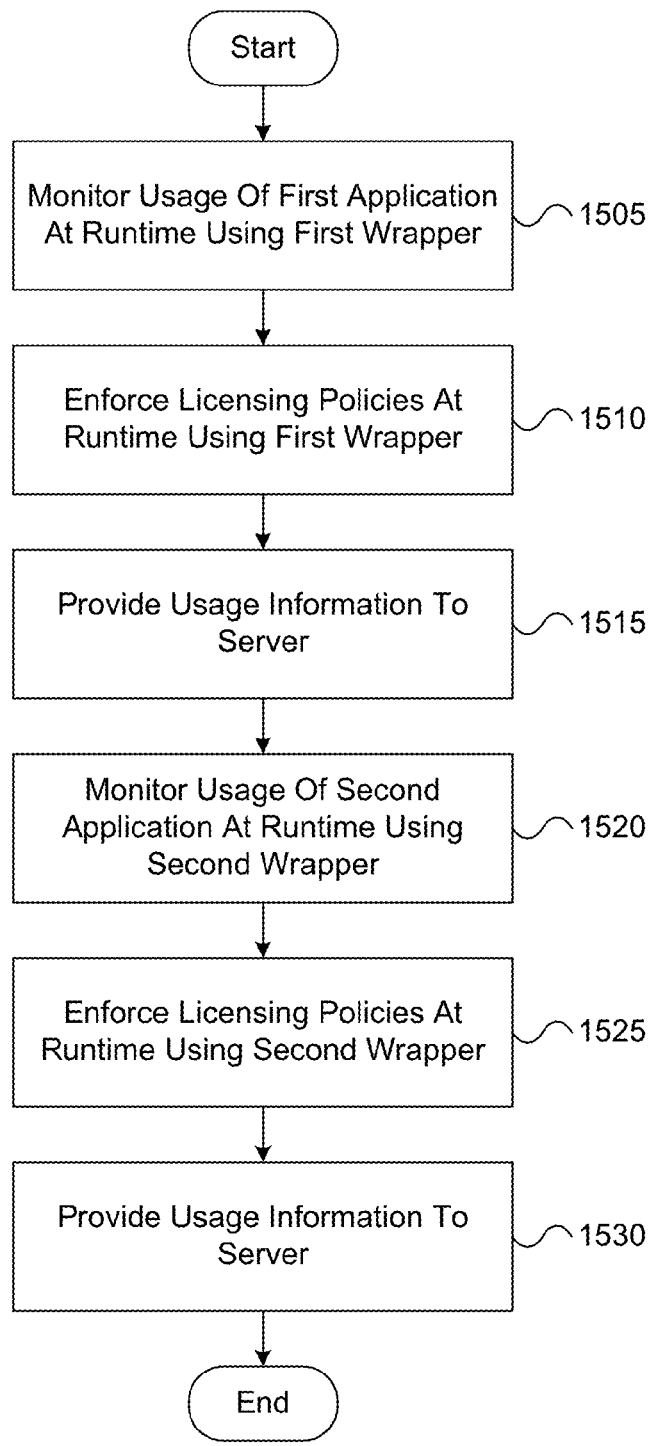
FIG. 15 depicts an illustrative method for enforcing licensing policies using an application wrapper in accordance with one or more example embodiments.

FIG. 15 depicts an illustrative method for enforcing licensing policies using an application wrapper in accordance with one or more example embodiments. Referring to FIG. 15, at step 1505, a computing device may monitor usage of a first application at runtime using a first application wrapper. At step 1510, the computing device may enforce one or more licensing policies on the first application at runtime using the first application wrapper based on the monitored usage of the first application. At step 1515, the computing device may provide first usage information to a license management server based on the monitored usage of the first application. At step 1520, the computing device may monitor usage of a second application at runtime using a second application wrapper. At step 1525, the computing device may enforce one or more licensing policies on the second application at runtime using the second application wrapper based on the monitored usage of the second application. At step 1530, the computing device may provide second usage information to the license management server based on the monitored usage of the second application.

Figure 16:
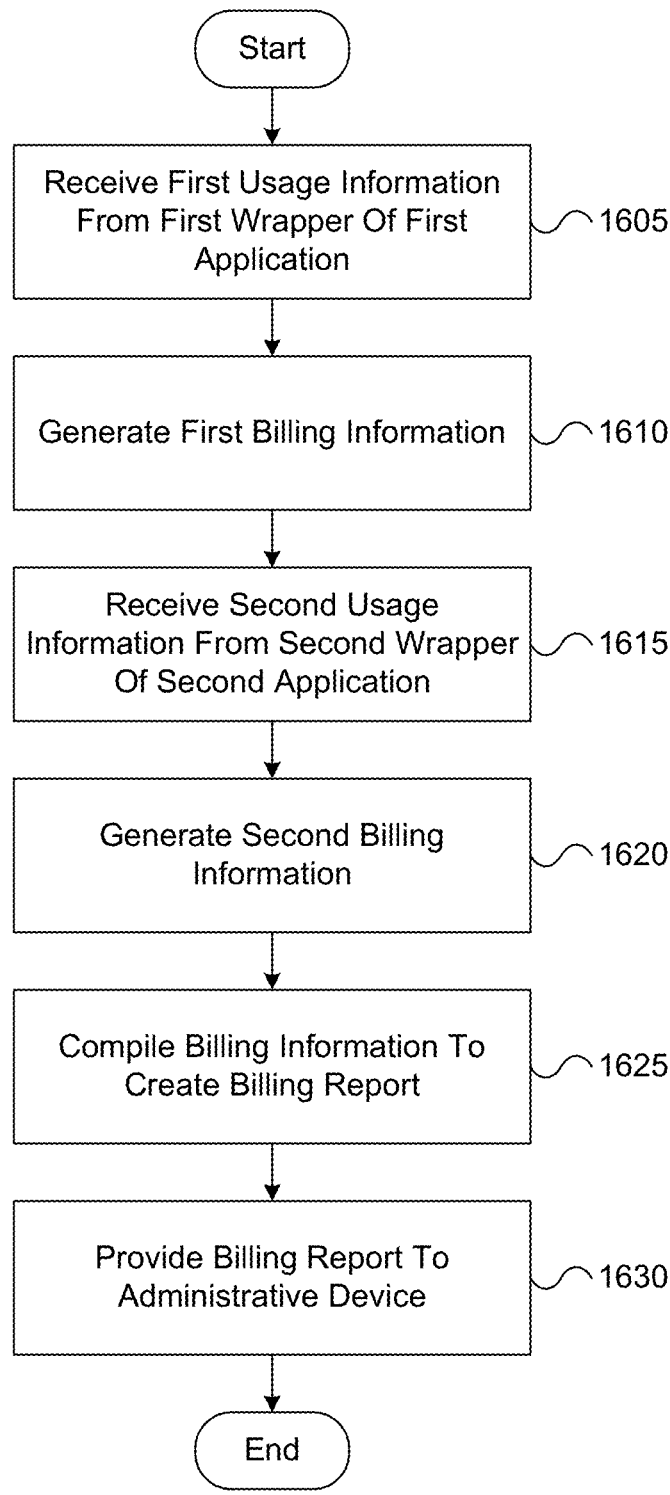
FIG. 16 depicts another illustrative method for enforcing licensing policies using an application wrapper in accordance with one or more example embodiments.

FIG. 16 depicts another illustrative method for enforcing licensing policies using an application wrapper in accordance with one or more example embodiments. Referring to FIG. 16, at step 1605, a computing platform may receive first usage information from a first application wrapper of a first application on a first computing device used by a first enterprise user of an enterprise organization. At step 1610, the computing platform may generate first billing information based on the first usage information. At step 1615, the computing platform may receive second usage information from a second application wrapper of a second application on a second computing device used by a second enterprise user of the enterprise organization. At step 1620, the computing platform may generate second billing information based on the second usage information. At step 1625, the computing platform may compile the first billing information and the second billing information into a billing report. At step 1630, the computing platform may provide the billing report to a third computing device used by an administrative user of the enterprise organization.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A method, comprising:
monitoring, by a first application wrapper of a first application on a computing device, usage of the first application, wherein the first application wrapper of the first application provides a policy enforcement layer between the first application and an operating system of the computing device, wherein the policy enforcement layer controls execution of the first application based on one or more mobile device management policies required by an enterprise organization to obtain access to one or more enterprise resources associated with the enterprise organization, and wherein the policy enforcement layer controls the execution of the first application based on the one or more mobile device management policies by selectively enabling or selectively disabling one or more features of the first application based on device state information monitored by the first application wrapper; and enforcing, by the first application wrapper of the first application, one or more licensing policies on the first application at runtime based on the usage of the first application, wherein enforcing the one or more licensing policies on the first application at runtime based on the usage of the first application comprises:

determining whether a license of a limited number of licenses for the first application is available for use by a user of the computing device;

based on determining that the license of the limited number of licenses for the first application is available for use by the user of the computing device, permitting the user of the computing device to use the first application;

based on determining that the license of the limited number of licenses for the first application is not available for use by the user of the computing device, placing the user of the computing device in a queue to use the first application until the license of the limited number of licenses for the first application becomes available; and after placing the user of the computing device in the queue to use the first application, presenting, by the first application wrapper, a notification alerting the user of the computing device when the license of the limited number of licenses for the first application becomes available.

2. The method of claim 1, wherein the policy enforcement layer controls the execution of the first application by intercepting input to the first application, intercepting output from the first application, and intercepting function calls made by the first application.

3. The method of claim 1, wherein enforcing the one or more licensing policies on the first application at runtime comprises allowing the first application to be used based on validating a license for the first application.

4. The method of claim 1, wherein enforcing the one or more licensing policies on the first application at runtime comprises preventing the first application from being used.

5. The method of claim 1, wherein enforcing the one or more licensing policies on the first application at runtime comprises prompting a user of the computing device to provide payment information.

6. The method of claim 1, wherein enforcing the one or more licensing policies on the first application at runtime comprises generating billing information based on the usage of the first application.

7. The method of claim 6,
wherein usage of a first function of the first application is billed at a first billing rate,
wherein usage of a second function of the first application is billed at a second billing rate different from the first billing rate, and
wherein the first application wrapper of the first application tracks the usage of the first function of the first application and the usage of the second function of the first application to generate the billing information.

8. The method of claim 6,
wherein usage of the first application by a first user is billed at a first billing rate,
wherein usage of the first application by a second user is billed at a second billing rate different from the first billing rate, and
wherein the first application wrapper of the first application tracks the usage of the first application by the first user and the usage of the first application by the second user to generate the billing information.

9. The method of claim 6,
wherein usage of the first application by a first user is billed to a first division of the enterprise organization,
wherein usage of the first application by a second user is billed to a second division of the enterprise organization different from the first division of the enterprise organization, and
wherein the first application wrapper of the first application tracks the usage of the first application by the first user and the usage of the first application by the second user to generate the billing information.

10. The method of claim 1, comprising:
providing, by the first application wrapper of the first application, usage information to a license management server that is configured to generate billing information based on the usage information, the usage information identifying the usage of the first application.

11. The method of claim 1, comprising:
monitoring, by a second application wrapper of a second application on the computing device, usage of the second application, wherein the second application wrapper of the second application provides a second policy enforcement layer between the second application and the operating system of the computing device, the second policy enforcement layer controlling execution of the second application based on a second set of one or more mobile device management policies; and
enforcing, by the second application wrapper of the second application, a second set of one or more licensing policies on the second application at runtime based on the usage of the second application.

12. A computing device, comprising:
at least one processor; and
memory storing computer-readable instructions that, when executed by the at least one processor, cause the computing device to:

monitor, by a first application wrapper of a first application on the computing device, usage of the first application, wherein the first application wrapper of the first application provides a policy enforcement layer between the first application and an operating system of the computing device, wherein the policy enforcement layer controls execution of the first application based on one or more mobile device management policies required by an enterprise organization to obtain access to one or more enterprise resources associated with the enterprise organization, and wherein the policy enforcement layer controls the execution of the first application based on the one or more mobile device management policies by selectively enabling or selectively disabling one or more features of the first application based on device state information monitored by the first application wrapper; and enforce, by the first application wrapper of the first application, one or more licensing policies on the first application at runtime based on the usage of the first application,
wherein enforcing the one or more licensing policies on the first application at runtime based on the usage of the first application comprises:
  determining whether a license of a limited number of licenses for the first application is available for use by a user of the computing device;
  based on determining that the license of the limited number of licenses for the first application is available for use by the user of the computing device, permitting the user of the computing device to use the first application;
  based on determining that the license of the limited number of licenses for the first application is not available for use by the user of the computing device, placing the user of the computing device in a queue to use the first application until the license of the limited number of licenses for the first application becomes available; and
  after placing the user of the computing device in the queue to use the first application, presenting, by the first application wrapper, a notification alerting the user of the computing device when the license of the limited number of licenses for the first application becomes available.

13. The computing device of claim 12, wherein the policy enforcement layer controls the execution of the first application by intercepting input to the first application, intercepting output from the first application, and intercepting function calls made by the first application.

14. The computing device of claim 12, wherein enforcing the one or more licensing policies on the first application at runtime comprises allowing the first application to be used based on validating a license for the first application.

15. The computing device of claim 12, wherein enforcing the one or more licensing policies on the first application at runtime comprises preventing the first application from being used.

16. The computing device of claim 12, wherein enforcing the one or more licensing policies on the first application at runtime comprises prompting a user of the computing device to provide payment information.

17. The computing device of claim 12, wherein enforcing the one or more licensing policies on the first application at runtime comprises generating billing information based on the usage of the first application.

18. The computing device of claim 12, wherein the memory stores additional computer-readable instructions that, when executed by the at least one processor, cause the computing device to:
  provide, by the first application wrapper of the first application, usage information to a license management server that is configured to generate billing information based on the usage information, the usage information identifying the usage of the first application.

19. One or more non-transitory computer-readable media storing instructions that, when executed by a computing device, cause the computing device to:
  monitor, by a first application wrapper of a first application on the computing device, usage of the first application, wherein the first application wrapper of the first application provides a policy enforcement layer between the first application and an operating system of the computing device, wherein the policy enforcement layer controls execution of the first application based on one or more mobile device management policies required by an enterprise organization to obtain access to one or more enterprise resources associated with the enterprise organization, and wherein the policy enforcement layer controls the execution of the first application based on the one or more mobile device management policies by selectively enabling or selectively disabling one or more features of the first application based on device state information monitored by the first application wrapper; and
  enforce, by the first application wrapper of the first application, one or more licensing policies on the first application at runtime based on the usage of the first application,
  wherein enforcing the one or more licensing policies on the first application at runtime based on the usage of the first application comprises:
    determining whether a license of a limited number of licenses for the first application is available for use by a user of the computing device;
    based on determining that the license of the limited number of licenses for the first application is available for use by the user of the computing device, permitting the user of the computing device to use the first application;
    based on determining that the license of the limited number of licenses for the first application is not available for use by the user of the computing device, placing the user of the computing device in a queue to use the first application until the license of the limited number of licenses for the first application becomes available; and
    after placing the user of the computing device in the queue to use the first application, presenting, by the first application wrapper, a notification alerting the user of the computing device when the license of the limited number of licenses for the first application becomes available.

20. The method of claim 1, wherein enforcing the one or more licensing policies on the first application at runtime based on the usage of the first application comprises:
  after presenting the notification alerting the user of the computing device when the license of the limited number of licenses for the first application becomes available, causing the license of the limited number of licenses for the first application to be reassigned to a next user in the queue to use the first application when the user of the computing device does not begin using the first application within a limited amount of time.

* * * * *